(12) United States Patent
Djalali et al.

(10) Patent No.: US 11,809,698 B1
(45) Date of Patent: Nov. 7, 2023

(54) PHRASE BUILDER FOR DATA ANALYTIC NATURAL LANGUAGE INTERFACE

(71) Applicant: Tableau Software, LLC, Seattle, WA (US)

(72) Inventors: Alex Djalali, Athens, GA (US); Amar Singh Lakhian, Oakland, CA (US); Qixiang Zhang, Sunnyvale, CA (US); Yukiko Ishida Anonuevo, Concord, CA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/588,193

(22) Filed: Jan. 28, 2022

(51) Int. Cl.
  *G06F 3/0482* (2013.01)
  *G06F 3/04847* (2022.01)

(52) U.S. Cl.
  CPC ........ *G06F 3/04847* (2013.01); *G06F 3/0482* (2013.01)

(58) Field of Classification Search
  CPC .................................................. G06F 3/048–05
  See application file for complete search history.

(56) References Cited

U.S. PATENT DOCUMENTS

| | | | | |
|---|---|---|---|---|
| 5,845,276 A | * | 12/1998 | Emerson | G06F 16/24561 |
| 5,884,304 A | * | 3/1999 | Davis, III | G06F 16/2448 707/E17.061 |
| 5,909,678 A | * | 6/1999 | Bergman | G06F 16/2428 707/999.005 |
| 5,978,804 A | * | 11/1999 | Dietzman | G06F 16/40 715/201 |
| 6,362,838 B1 | * | 3/2002 | Szlam | H04M 3/51 379/142.17 |
| 9,933,928 B2 | * | 4/2018 | Mackinlay | G06T 11/00 |
| 10,515,121 B1 | * | 12/2019 | Setlur | G06F 16/90332 |
| 10,705,695 B1 | * | 7/2020 | Porath | G06F 3/0486 |
| 10,896,297 B1 | * | 1/2021 | Tory | G06F 40/40 |
| 11,055,284 B1 | * | 7/2021 | Vogelsgesang | G06F 16/2454 |
| 2001/0021935 A1 | * | 9/2001 | Mills | G06F 16/81 707/999.102 |
| 2002/0133488 A1 | * | 9/2002 | Bellis | G06F 16/903 707/E17.135 |
| 2003/0046639 A1 | * | 3/2003 | Fai | G06Q 10/10 |
| 2005/0010601 A1 | * | 1/2005 | Ciaramitaro | G06F 16/93 |

(Continued)

*Primary Examiner* — Daniel Rodriguez
(74) *Attorney, Agent, or Firm* — Morgan, Lewis & Bockius LLP

(57) ABSTRACT

The various implementations described herein include methods and devices for constructing phrases for data visualizations. In one aspect, a method includes presenting a data visualization page to a user including a visualization region and a phrase region; obtaining a dataset including a plurality of fields; displaying a phrase affordance for constructing a phrase; in response to a user selection of the phrase affordance, presenting a phrase construction menu including a set of fields; in response to a user selection of a field, presenting a set of aggregation operators selected based on a field type of the field; in response to a user selection of an aggregation operator, generating a first phrase using the selected field and the selected aggregation operator; presenting a data visualization generated using the first phrase; and displaying the first phrase as an active phrase in the phrase region.

20 Claims, 26 Drawing Sheets

(56) References Cited

U.S. PATENT DOCUMENTS

| | | | |
|---|---|---|---|
| 2006/0010416 A1* | 1/2006 | Keck | G06Q 10/06 |
| | | | 700/121 |
| 2006/0155689 A1* | 7/2006 | Blakeley | G06F 16/951 |
| 2009/0077012 A1* | 3/2009 | Glowacki | G06F 16/2423 |
| | | | 707/999.005 |
| 2009/0112986 A1* | 4/2009 | Caceres | G06Q 10/109 |
| | | | 709/204 |
| 2010/0250574 A1* | 9/2010 | Dettinger | G06F 16/24522 |
| | | | 707/760 |
| 2010/0257155 A1* | 10/2010 | Dettinger | G06F 16/245 |
| | | | 707/E17.11 |
| 2012/0254832 A1* | 10/2012 | Aman | G06F 16/24 |
| | | | 717/109 |
| 2013/0111375 A1* | 5/2013 | Frohliger | G06F 16/242 |
| | | | 715/763 |
| 2014/0195888 A1* | 7/2014 | Alford, Jr. | G06F 40/174 |
| | | | 715/226 |
| 2016/0012015 A1* | 1/2016 | Tran | G06F 3/04842 |
| | | | 715/221 |
| 2017/0185603 A1* | 6/2017 | Dentel | G06F 16/3322 |
| 2017/0236229 A1* | 8/2017 | Roof | G06Q 50/26 |
| | | | 705/345 |
| 2019/0361892 A1* | 11/2019 | Krishna | G06F 16/1865 |
| 2020/0089700 A1* | 3/2020 | Ericson | G06F 40/205 |
| 2020/0110803 A1* | 4/2020 | Djalali | G06F 16/904 |
| 2021/0011915 A1* | 1/2021 | Raichur | G06F 16/248 |
| 2021/0158933 A1* | 5/2021 | Frosch | G16H 40/67 |
| 2021/0333954 A1* | 10/2021 | Atallah | G06F 16/212 |
| 2022/0121350 A1* | 4/2022 | Nair | G06F 16/285 |

\* cited by examiner

Figure 1:
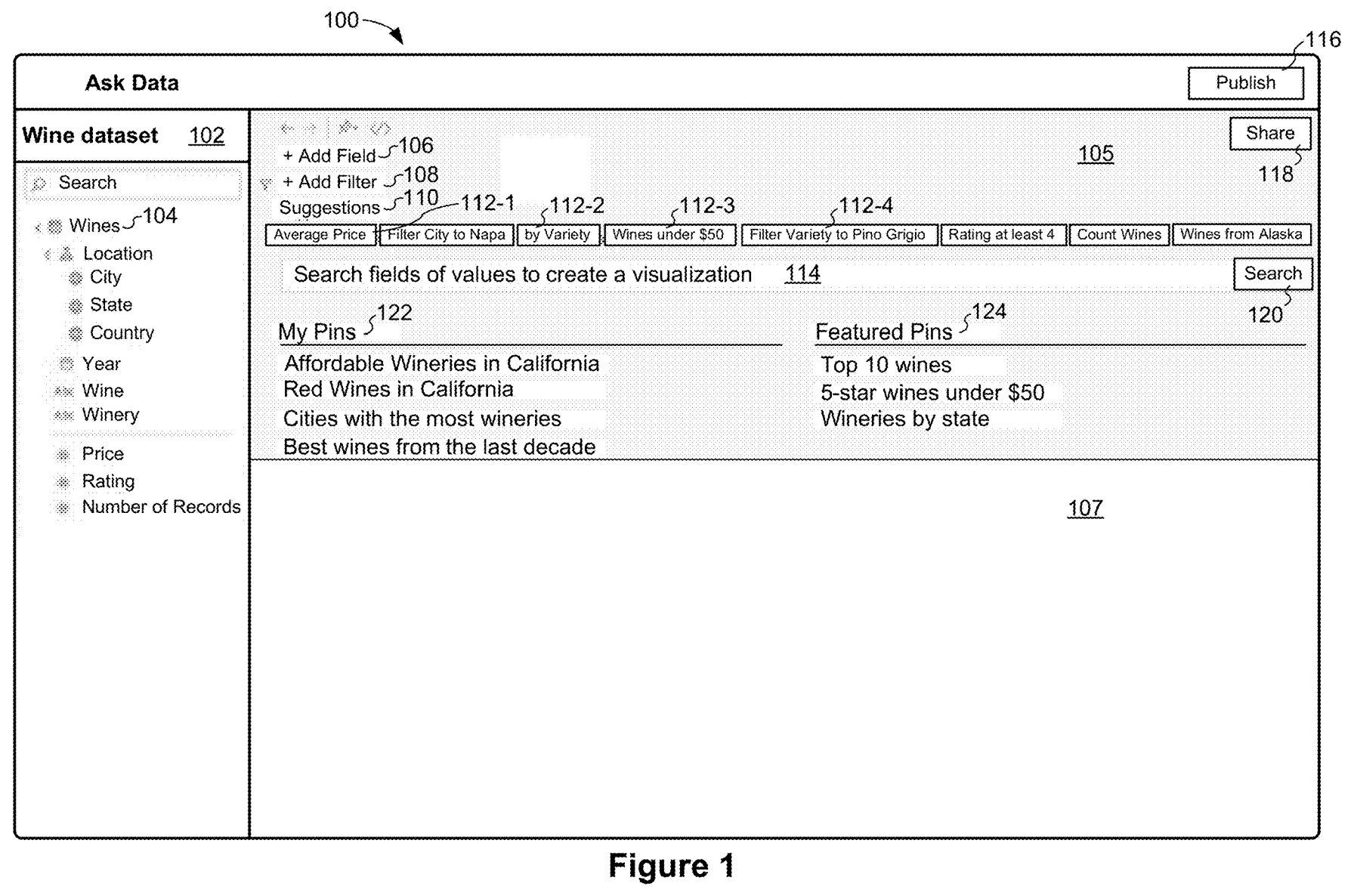

Ask Data

Wine dataset 102

- Search
- Wines 104
  - Location
    - City
    - State
    - Country
  - Year
  - Wine
  - Winery
  - Price
  - Rating
  - Number of Records + Add Field 106
+ Add Filter 108
Suggestions 110

| Average Price | Filter City to Napa | by Variety | Wines under $50 | Filter Variety to Pino Grigio | Rating at least 4 | Count Wines | Wines from Alaska |

112-1  112-2  112-3  112-4

Search fields of values to create a visualization 114

My Pins 122
Affordable Wineries in California
Red Wines in California
Cities with the most wineries
Best wines from the last decade Featured Pins 124
Top 10 wines
5-star wines under $50
Wineries by state Publish 116
Share 118
Search 120

PHRASE BUILDER FOR DATA ANALYTIC NATURAL LANGUAGE INTERFACE

RELATED APPLICATIONS

This application is related to U.S. Utility patent application Ser. No. 17/588,189, entitled "Phrase Recommendations for Data Visualizations," filed Jan. 28, 2022, which is incorporated by reference herein in its entirety.

TECHNICAL FIELD

The disclosed implementations relate generally to data visualizations and more specifically to systems and methods of constructing phrases for data visualizations.

BACKGROUND

Data analytics applications enable a user to understand a data set visually, including distribution, trends, outliers, and other factors that are important to making business decisions. Some data sets are very large or complex and include many data fields. Various tools can be used to help understand and analyze the data, including dashboards that have multiple data visualizations. However, it can be challenging for users to find the fields, filters, and aggregations to construct their desired visualizations.

SUMMARY

A phrase construction system of the present disclosure provides a menu-based approach to assist users of a data analytics application in constructing meaningful data visualizations. For example, a phrase construction system presents fields of a dataset to a user for aggregations, groupings, and/or filters. In this example, once the user selects a field, the system recommends valid operators, and values, to the user to generate meaningful visualizations. In this way, the system only allows valid phrases to be built, e.g., excludes phrases that would result in a null set for the visualization.

A phrase construction system of the present disclosure uses historical usage data to recommend a list of phrases (analytical statements) or phrase components for users to apply to a data visualization in accordance with some implementations. Some conventional systems require a user to type a query and generate a visualization from query interpretations. The present system provides a more convenient and efficient way for a user to incrementally construct a visualization. For example, a phrase construction system of the present disclosure may apply a probability-based machine learning model to recommend phrases to users.

As an example, a phrase construction system collects occurrences and concurrences of phrases in historical visualizations created by users. In this example, at a recommendation time, if there isn't an existing visualization being displayed, the system recommends phrases with most historical occurrences. If there is a visualization being displayed, the system in this example goes through all subsets of the phrases embedded in the visualization and chooses subsets that have historical occurrence and contain the most elements (e.g., using a greedy algorithm). The system in this example then goes through single phrases with historical occurrences as candidates. For every candidate, it calculates its concurrence probability with each subset selected above. The system in this example then multiplies all the candidate's concurrence probabilities with subsets, and that product becomes the candidate's concurrence probability with the displayed visualization. Next, phrases with highest concurrence probability are recommended to the user. In this way, the phrase construction system utilizes an idiosyncratic machine learning model that recommends a phrase from historical usage data. The system is able to recommend phrases that are semantically consistent, syntactically correct, and relevant to the displayed visualization.

In accordance with some implementations, a method is performed at a computing system having memory and one or more processors. The method includes: (i) presenting a data visualization page to a user, the data visualization page including a first region for displaying a data visualization and a second region for phrase recommendations; (ii) obtaining a dataset selected by the user, the dataset including a plurality of fields; (iii) generating a first set of phrase recommendations based on the dataset, each phrase recommendation in the first set of phrase recommendations corresponding to a respective field in the plurality of fields; (iv) displaying the first set of phrase recommendations in the second region; (v) receiving a user selection of a first phrase of the first set of phrase recommendations; and, in response to the user selection: (vi) presenting a data visualization in the first region, the data visualization generated using the first phrase; and (vii) displaying a second set of phrase recommendations generated based on the user selection of the first phrase.

In accordance with some implementations, a method is performed at a computing system having memory and one or more processors. The method includes: presenting a data visualization page to a user, the data visualization page including a visualization region and a phrase region; obtaining a dataset selected by the user, the dataset including a plurality of fields; displaying, in the phrase region, a phrase affordance for constructing a phrase; in response to a user selection of the phrase affordance, presenting a phrase construction menu, the phrase construction menu including a set of fields from the plurality of fields; in response to a user selection of a field from the set of fields, presenting a set of aggregation operators selected based on a field type of the field; in response to a user selection of an aggregation operator from the set of aggregation operators, generating a first phrase using the selected field and the selected aggregation operator; presenting a data visualization in the visualization region, the data visualization generated using the first phrase; and displaying the first phrase as an active phrase in the phrase region.

In some implementations, a computing device includes one or more processors, memory, a display, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors, memory, and a display. The one or more programs include instructions for performing any of the methods described herein.

Thus, methods and systems are disclosed that identify and recommend phrases or phrase components for constructing data visualizations. Such methods and systems may complement or replace conventional methods and systems of constructing data visualizations.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIG. 1 illustrates an example graphical user interface in accordance with some implementations.

FIGS. 3A-3I illustrate example graphical user interfaces in accordance with some implementations.

Figure 2A:
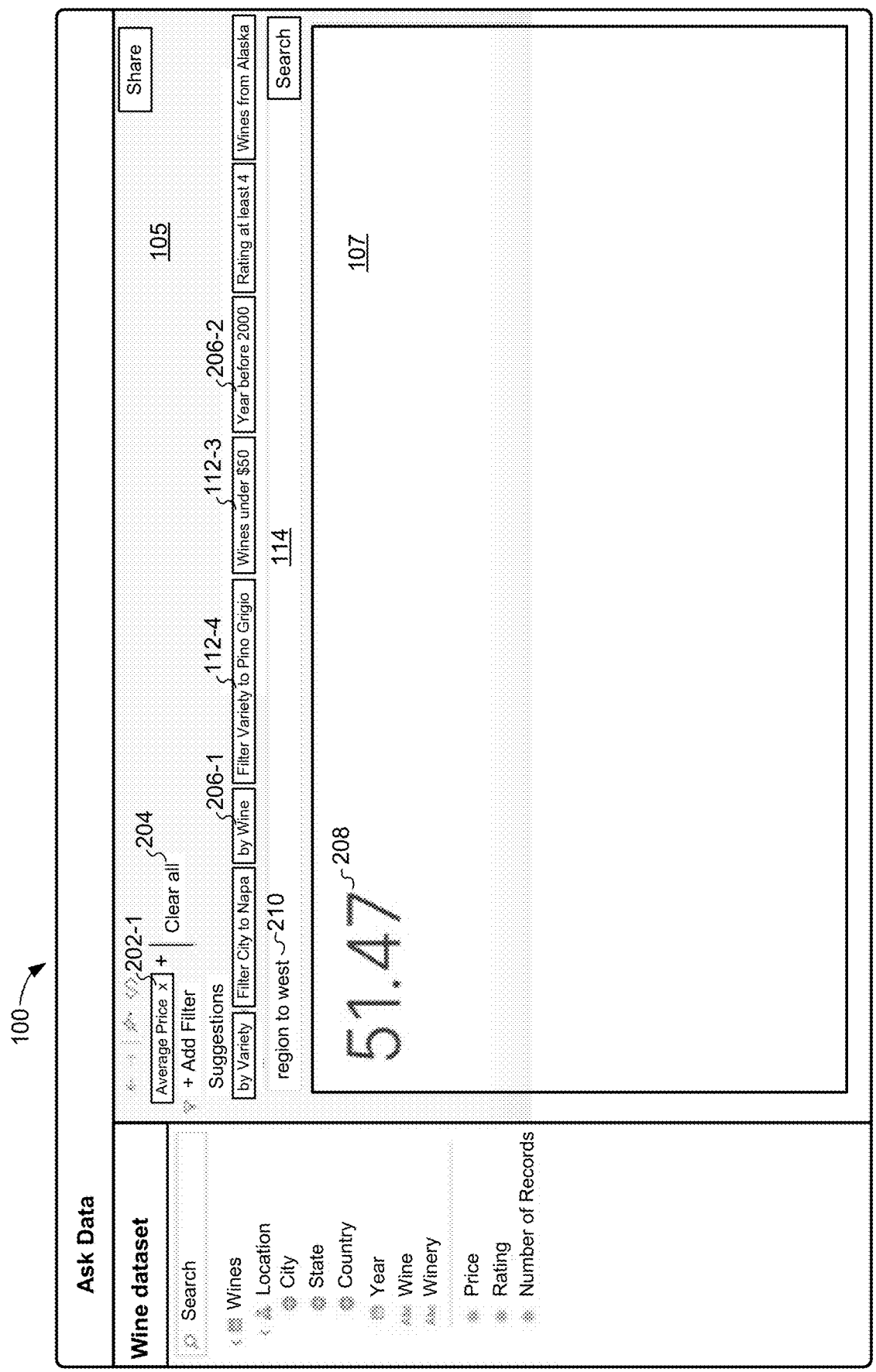
FIGS. 2A-2C illustrate example graphical user interfaces in accordance with some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Users wishing to visualize large datasets can encounter significant difficulty in identifying the appropriate fields, filters, and aggregations to achieve their desired data visualization. In accordance with some implementations, systems and methods are disclosed for recommending phrases, such as filter phrases and aggregation phrases, for a user to build a visualization. For example, the phrases are recommended by analyzing historical phrase usage patterns. In the case where the user has selected at least one phrase (or field, filter, or aggregation), the recommended phrases may be phrases that have a high historical concurrence with the selected phrase. In the case where the user has selected multiple phrases, the recommended phrases may be phrases that have a high historical concurrence with all of the multiple phrases, or the largest subset of the multiple phrases. In this way, the recommended phrases improve efficiency and reduce trial and error by the user in constructing appropriate data visualizations.

In accordance with some implementations, systems and methods are disclosed for building phrases, such as filter phrases and aggregation phrases, for a user to build a visualization. For example, a user may select an aggregation phrase button or a filter phrase button on the user interface. In response to a user selection of one the buttons, valid fields of the dataset are selected and presented to the user, e.g., ranked by likelihood of use in a data visualization. After the user selects a field, valid operators for that field are present. After a user selects a valid operator, the system constructs a phrase and updates the data visualization based on the constructed phrase. In this way, the phrases improve efficiency and reduce trial and error by the user by preventing the construction of invalid phrases and by promoting fields and operators most likely to be used in a meaningful data visualization.

FIG. 1 illustrates a graphical user interface 100 in accordance with some implementations. The graphical user interface 100 includes a dataset pane 102 indicating the selected dataset 104 and fields of the selected dataset. The graphical user interface 100 further includes a phrase region 105 and a visualization region 107. The visualization region 107 is blank in the example of FIG. 1, as the user has not yet selected any fields, filters, or phrases. In accordance with some implementations, the phrase region 105 includes an add field affordance 106, an add filter affordance 108, suggestions 110, a search field 114 and corresponding search affordance 120, user pins 122, and featured pins 124. The graphical user interface 100 also includes a publish affordance 116 to publish the user interface and a share affordance 118 to share the user interface 100 (or portions thereof), e.g., to share a screen capture of the user interface 100.

The add field affordance 106 enables a user to add a field for the visualization (e.g., by opening an 'add field' window or pane for the user). The add filter affordance 108 enables a user to add a filter for the visualization (e.g., by opening an 'add filter' window or pane for the user). The suggestions 110 include multiple phrase recommendations 112. In the example illustrated in FIG. 1, the dataset is a wine dataset and the recommended phrases include an 'Average Price' phrase recommendation 112-1, a 'by Variety' phrase recommendation 112-2, a 'Wines under $50' recommendation 112-3, and a 'Filter Variety to Pino Grigio' recommendation 112-4. In some implementations, the phrase recommendations 112 are based on historical visualizations of the dataset, e.g., the phrase recommendations 112 are based on phrases previously used by users to visualize the dataset.

The search field 114 enables a user to input search terms for phrases (e.g., search for available, valid phrases) for constructing a visualization. The search affordance 120 causes the inputted search terms to be sent to a search engine to return phrases, e.g., to search for valid phrases containing the inputted search terms. In some implementations, search terms input by a user are matched to valid fields and operators prior to being sent to the search engine. The user pins 122 in FIG. 1 include a plurality of phrases previously pinned by the user. The featured pins 124 in FIG. 1 include a plurality of phrases previously pinned by other users. In some implementations, selection of a pin from the user pins 122 or the featured pins 124 causes a corresponding data visualization to be displayed in the visualization region 107.

FIG. 2A illustrates the graphical user interface 100 in accordance with some implementations. In the example of FIG. 2A, the 'Average Price' phrase recommendation 112-1 from FIG. 1 has been selected and shows as an active phrase 202-1. In some implementations, the user selects a phrase recommendation 112 by clicking on the phrase or dragging and dropping the phrase (e.g., dropping into the active phrase section or into the data visualization region 107). FIG. 2A further shows a clear all affordance 204 to clear the active phrases and an example search phrase 210 in the search field 114.

The suggestions 110 in FIG. 2A have been updated to include a 'by Wine' phrase recommendation 206-1 and a 'Year before 2000' phrase recommendation 206-2. In accordance with some implementations, the suggestions 110 have also been re-ranked based on the active phrase 202-1. For example, phrases with a high concurrence with the active phrase 202-1 are listed before phrases with a lower concurrence with the active phrase 202-1. A data visualization 208

(e.g., a numerical display of the average price) is shown in the data visualization region 107 and corresponds to the active phrase 202.

Figure 2B:
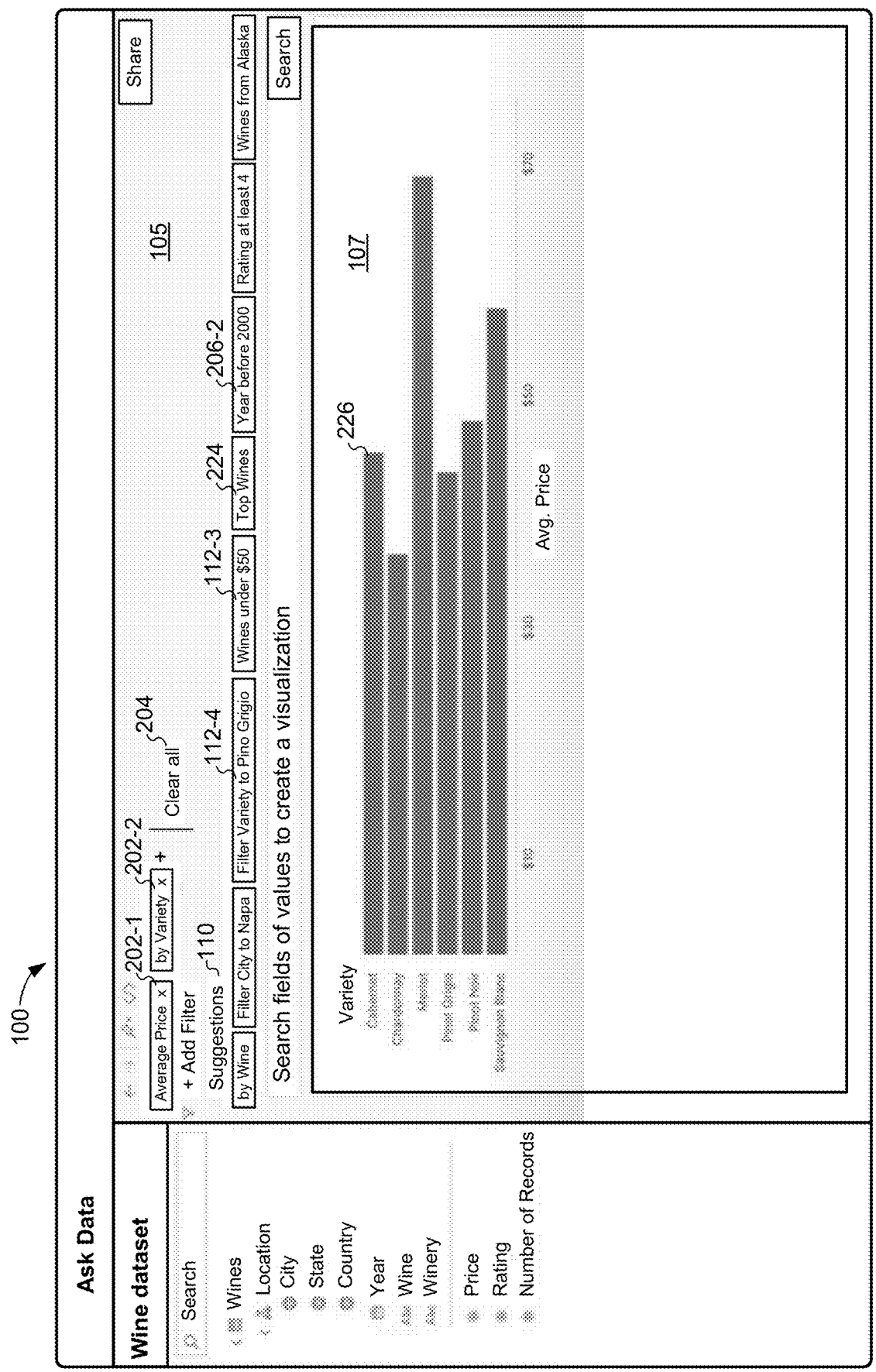

FIG. 2B illustrates the graphical user interface 100 in accordance with some implementations. In the example of FIG. 2B, the 'by Variety' phrase recommendation 112-2 from FIG. 1 has been selected and shows as an active phrase 202-2, along with the active phrase 202-1. The suggestions 110 in FIG. 2B have been re-ranked and updated to include a 'Top Wines' phrase recommendation 224. In accordance with some implementations, the suggestions 110 have been re-ranked based on the active phrases 202-1 and 202-2. For example, the phrases with a high concurrence with both of the active phrases 202 are listed before phrases with a high concurrence with just one of the active phrases 202. An updated data visualization 226 (e.g., a bar chart of average price by variety) is shown in the data visualization region 107 and corresponds to the active phrases 202-1 and 202-2.

Figure 2C:
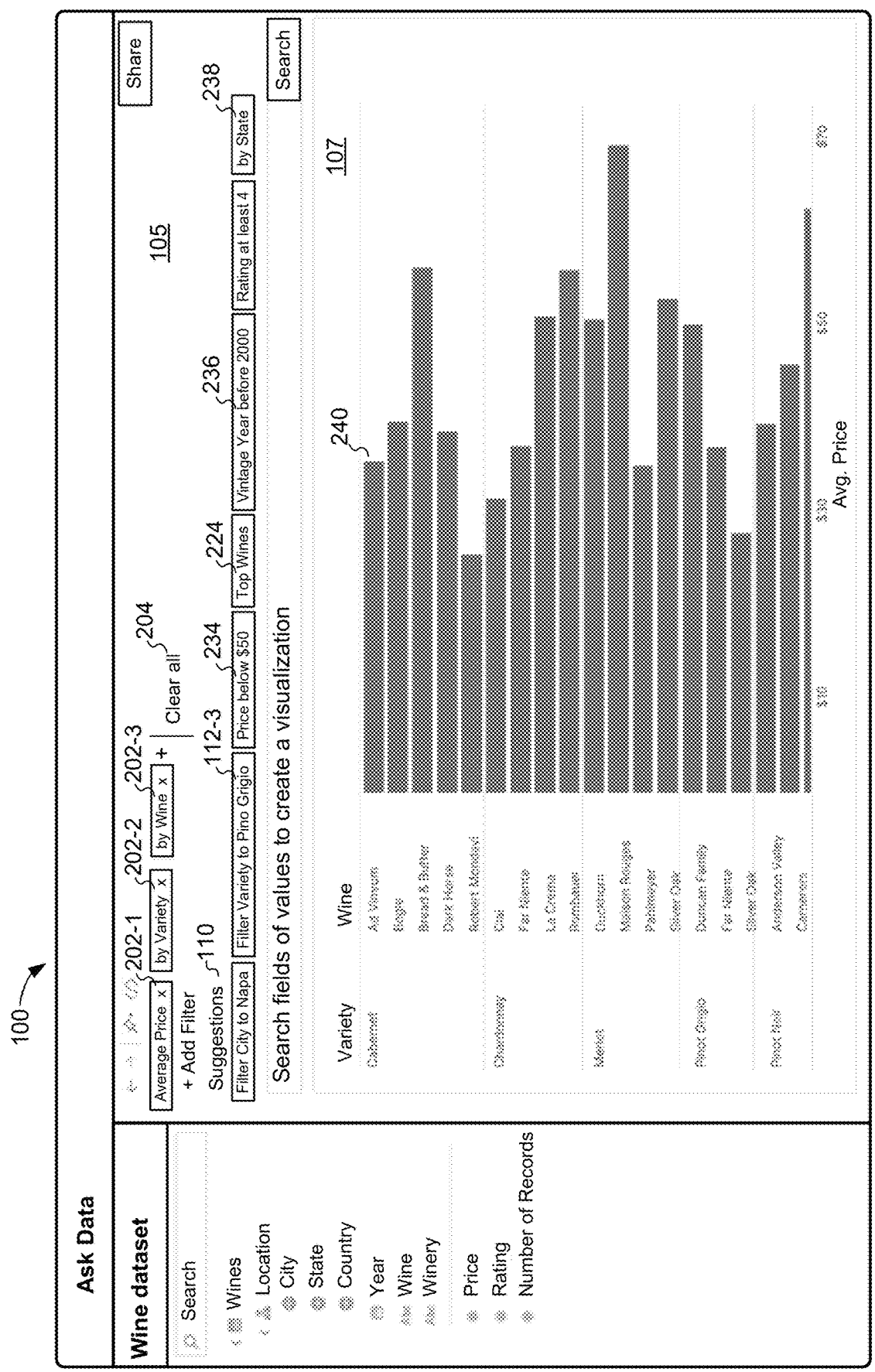

FIG. 2C illustrates the graphical user interface 100 in accordance with some implementations. In the example of FIG. 2C, the 'by Wine' recommended phrase 206-1 from FIG. 2A has been selected and shows as an active phrase 202-3, along with the active phrases 202-1 and 202-2. The suggestions 110 in FIG. 2C have been re-ranked and updated to include a 'Price below $50' phrase recommendation 234, the 'Vintage Year before 2000' phrase recommendation 236, and the 'by State' phrase recommendation 238. In accordance with some implementations, the 'Vintage Year before 2000' phrase recommendation 236 is a rewording of the 'Year before 2000' phrase recommendation 206-2, e.g., the phrase recommendation 236 and the phrase recommendation 206-2 correspond to a same expression in a visualization language used to construct the data visualization. In some implementations, the wording of the phrase recommendation is selected or generated based on the active phrases 202. In accordance with some implementations, the suggestions 110 have been re-ranked based on the active phrases 202-1, 202-2, and 202-3. For example, the phrases with a high concurrence with all of the active phrases 202 are listed before phrases with a high concurrence with just a subset of the active phrases 202. An updated data visualization 240 (e.g., a bar chart of average price by variety that is sorted by wine) is shown in the data visualization region 107 and corresponds to the active phrases 202-1, 202-2, and 202-3.

Figure 3A:
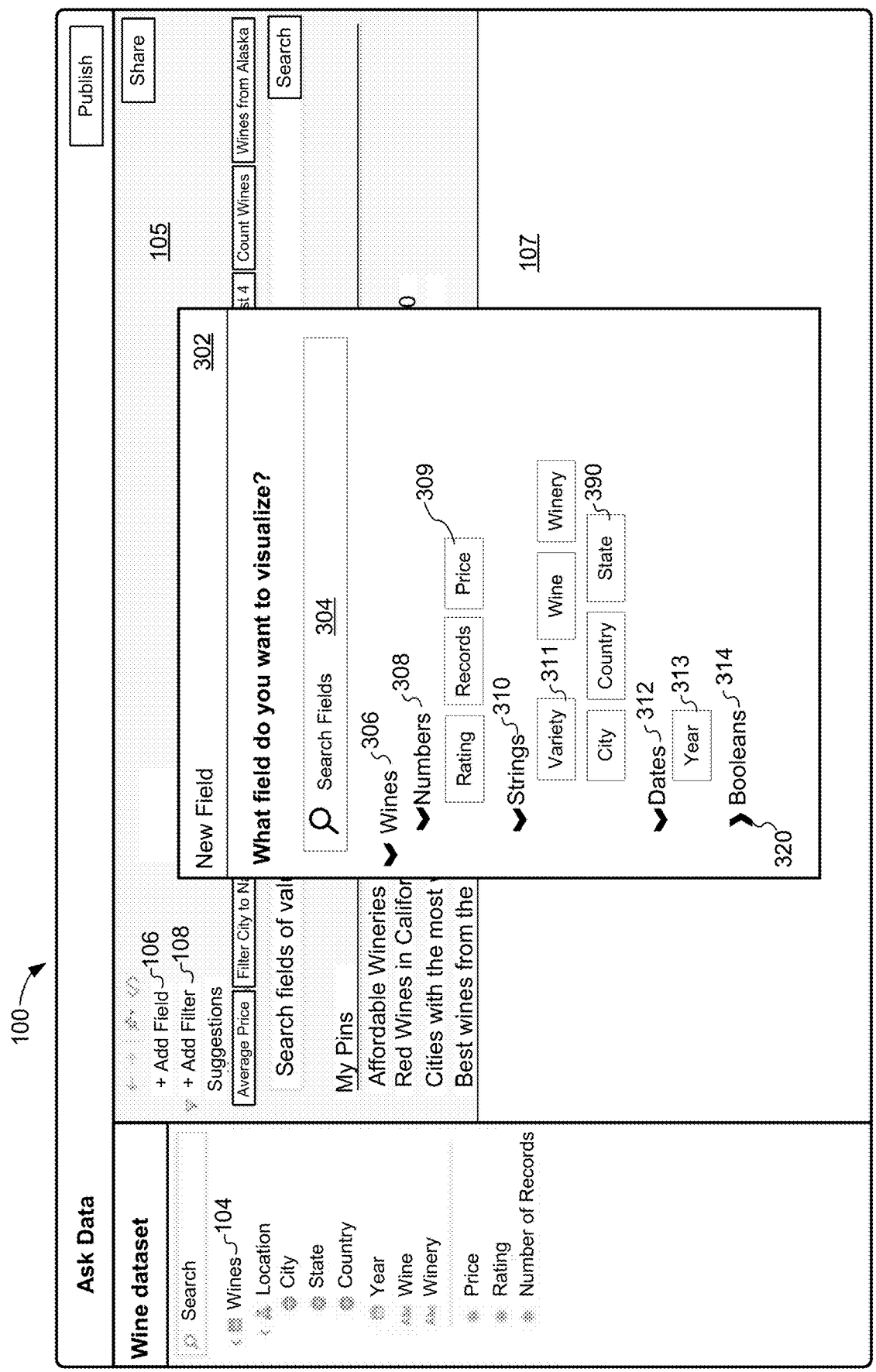

FIG. 3A illustrates the graphical user interface 100 in accordance with some implementations. In the example of FIG. 3A, a new field menu 302 (e.g., a window or pane within the user interface 100) is shown in response to a user selecting the add field affordance 106. In accordance with some implementations, the new field menu 302 assists a user with constructing a valid phrase for the visualization region 107. The new field menu 302 includes an indicator 306 for the selected dataset 104 and groupings of selected fields (e.g., by field type) from the selected dataset 104. The groupings include a numbers grouping 308 having a price field 309, a rating field, and a records field. The groupings also include a strings grouping 310 having a city field, a country field, a state field, a wine field, a winery field, and a variety field 311. The groupings also include a dates grouping 312 having a year field 313 and a Booleans grouping 314. In the example of FIG. 3A, the Booleans grouping 314 is collapsed as indicated by the expand/collapse affordance 320. The new field menu 302 also includes a search field 304 to enable a user to input search terms for fields for constructing the phrase, e.g., available and valid fields.

Figure 3B:
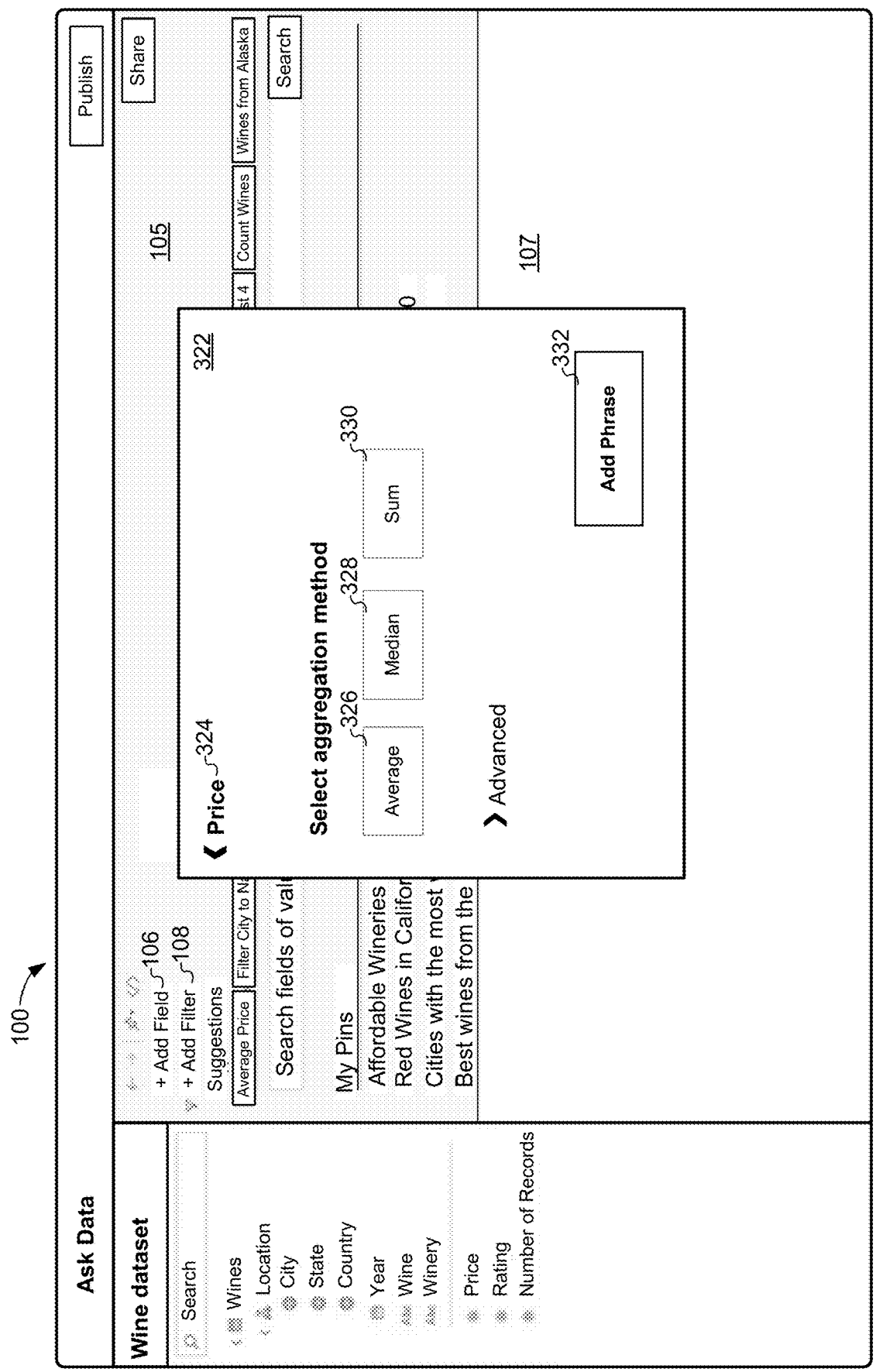

FIG. 3B illustrates the graphical user interface 100 in accordance with some implementations. In the example of FIG. 3B, a select aggregation menu 322 is shown in response to a user selecting the price field 309 from the new field menu 302 in FIG. 3A, as indicated by the price label 324. The select aggregation menu 322 includes valid aggregation operators for the price field 309. The valid aggregation operators include the average operator 326, the median operator 328, and the sum operator 330. The select aggregation menu 322 also includes an add phrase affordance 332.

Figure 3C:
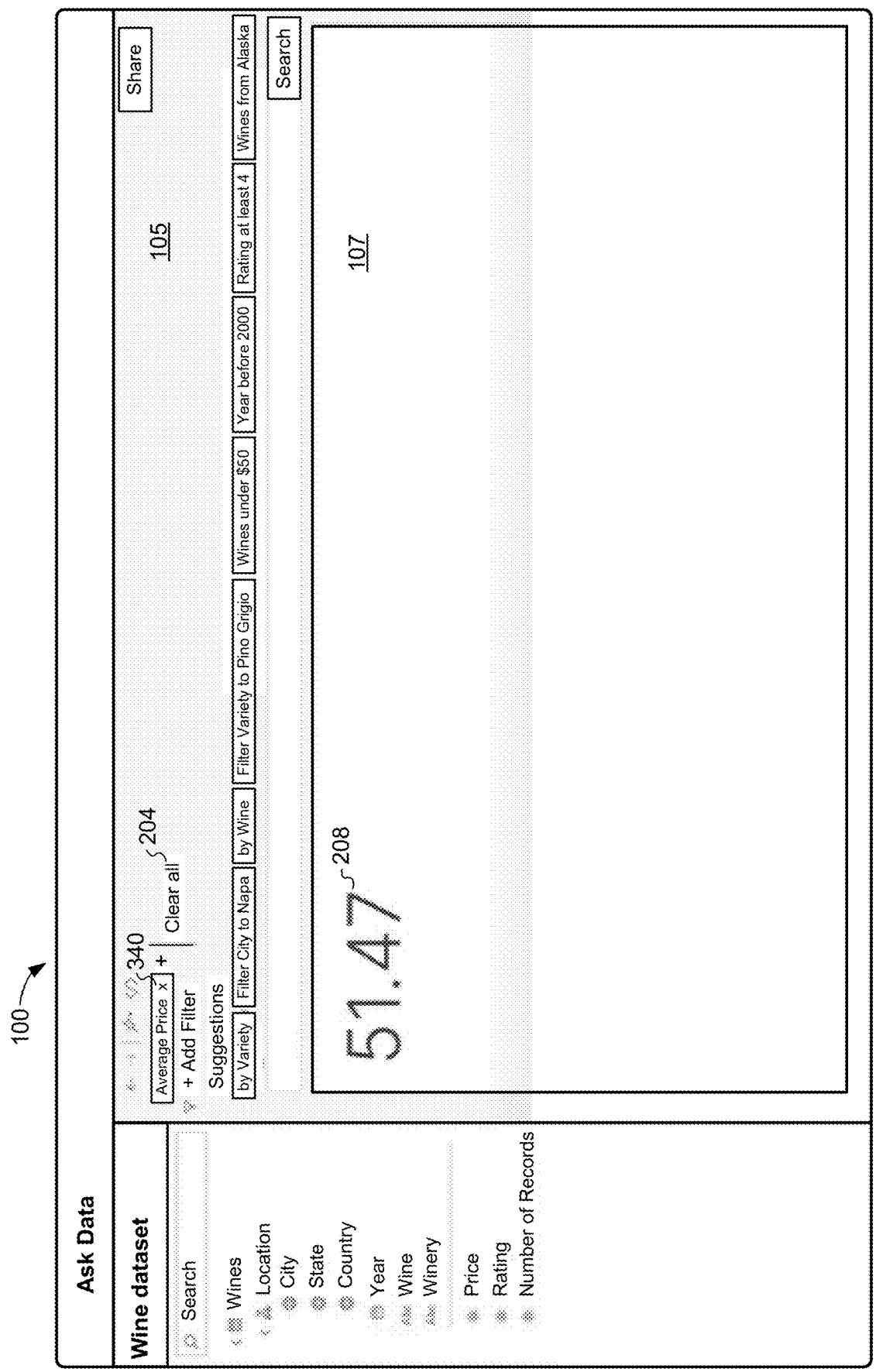

FIG. 3C illustrates the graphical user interface 100 in accordance with some implementations. In the example of FIG. 3C, the 'Average Price' phrase 340 has been construction in accordance with a user selection of the average operator 326 and the add phrase affordance 332 from FIG. 3B. FIG. 3C further shows a clear all affordance 204 to clear the active phrase. A data visualization 208 (e.g., a numerical display of the average price) is shown in the data visualization region 107 and corresponds to the average price phrase 340. In accordance with some implementations, the user interface 100 in FIG. 3C is the same as the user interface 100 in FIG. 2A, as the same phrase is active in both figures.

Figure 3D:
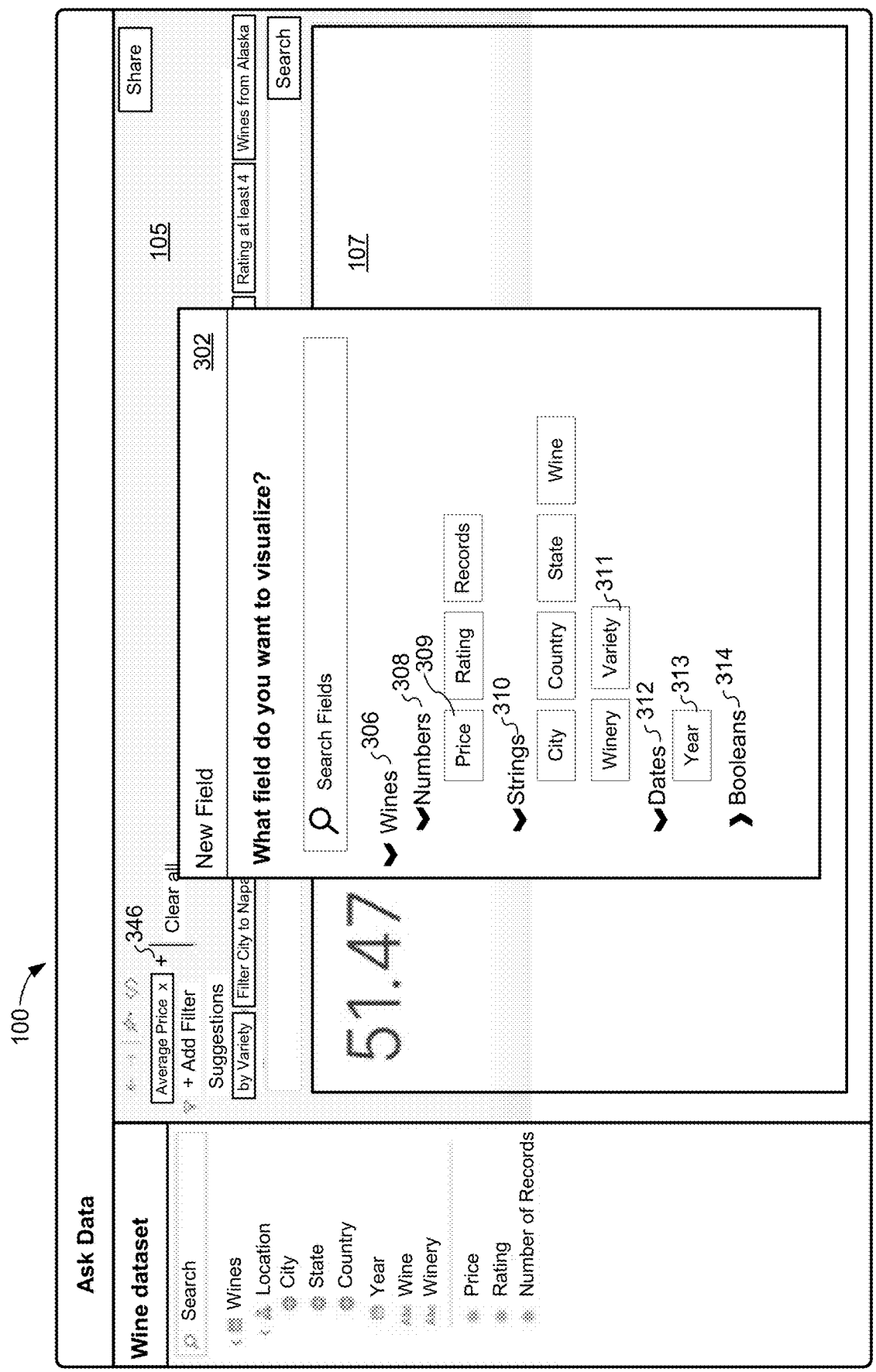

FIG. 3D illustrates the graphical user interface 100 in accordance with some implementations. In the example of FIG. 3D, the new field menu 302 is shown in response to a user selecting the add field affordance 346. The new field menu 302 includes the indicator 306 for the selected dataset 104 and groupings of selected fields from the selected dataset 104. The groupings include the numbers grouping 308, the strings grouping 310, the dates grouping 312, and the Booleans grouping 314. In the example of FIG. 3D, the fields within the numbers grouping 308 and the strings grouping 310 are rearranged as compared to the example of FIG. 3A. In accordance with some implementations, the fields within the groupings are arranged based on historical usage with phrases or fields used in the active data visualization (e.g., the data visualization 208 shown in FIG. 3C).

Figure 3E:
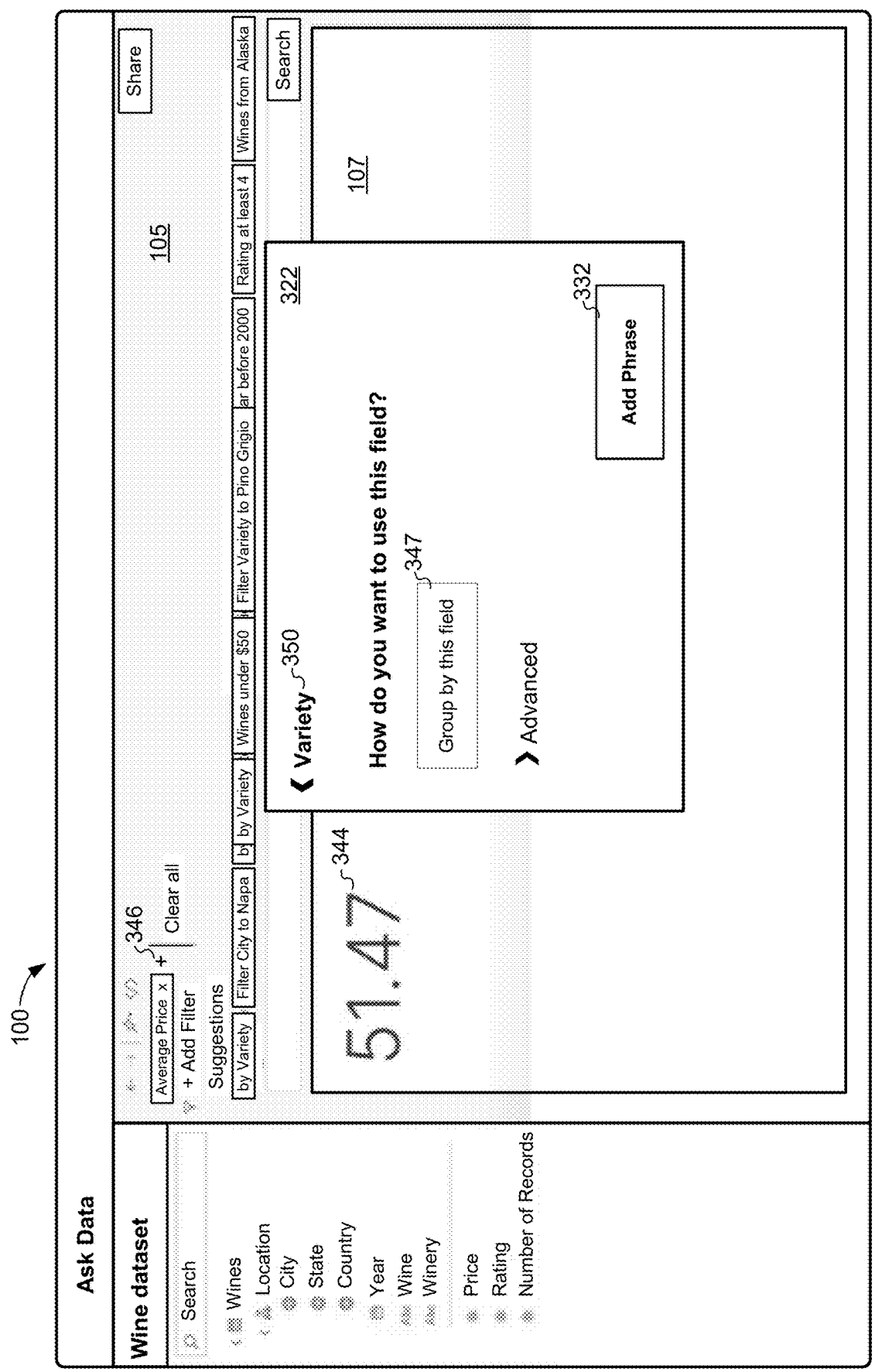

FIG. 3E illustrates the graphical user interface 100 in accordance with some implementations. In the example of FIG. 3E, a select aggregation menu 322 is shown in response to a user selecting the variety field 311 from the new field menu 302 in FIG. 3D, as indicated by the variety label 350. The select aggregation menu 322 includes valid aggregation operators for the variety field 311. The valid aggregation operators include group by operator 347. The select aggregation menu 322 also includes an add phrase affordance 332.

Figure 3F:
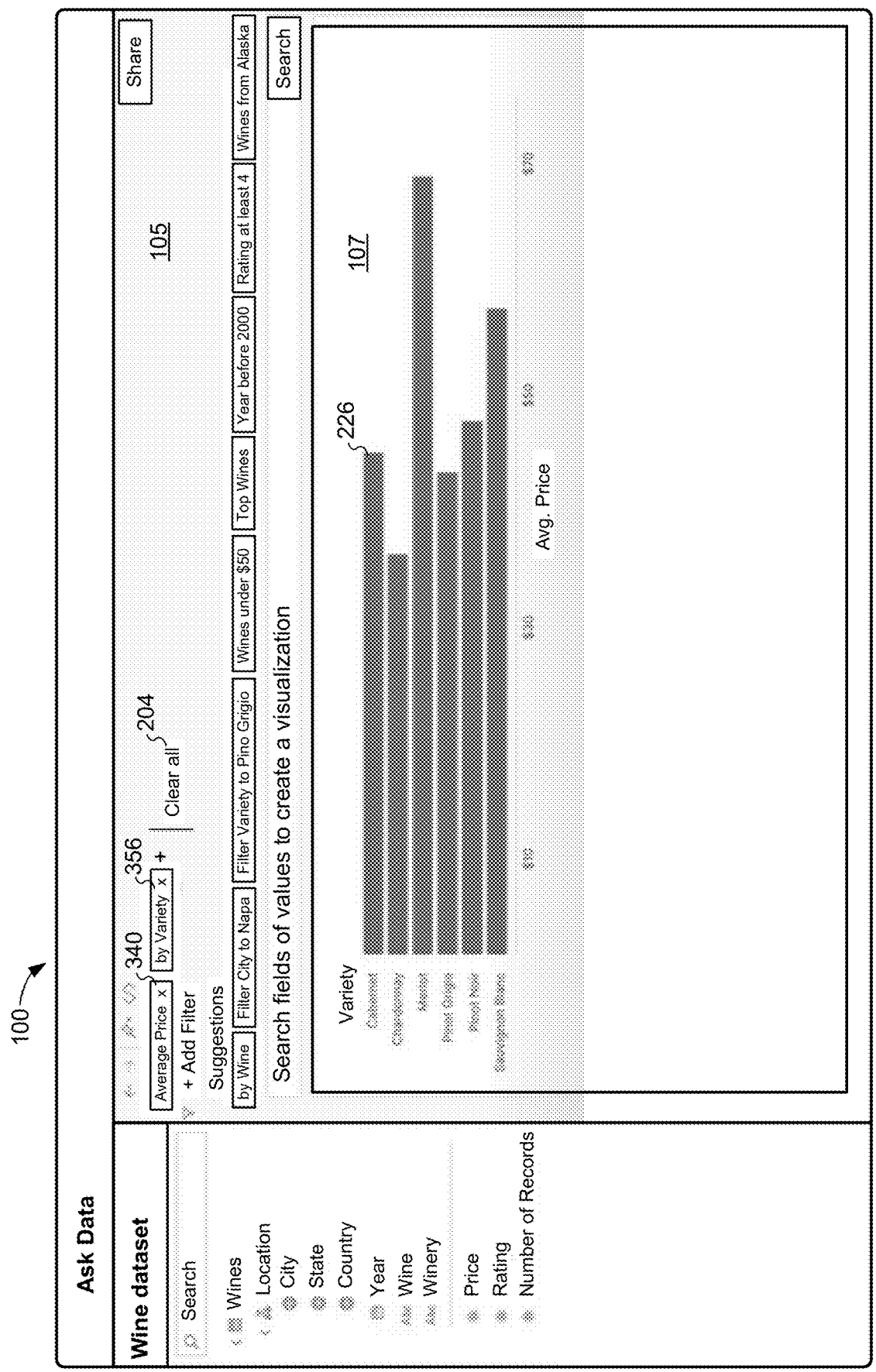

FIG. 3F illustrates the graphical user interface 100 in accordance with some implementations. In the example of FIG. 3F, the 'by Variety' phrase 356 has been construction in accordance with a user selection of the group by operator 347 and the add phrase affordance 332 from FIG. 3E. FIG. 3F further shows a clear all affordance 204 to clear the active phrases. An updated data visualization 226 (e.g., a bar chart of average price by variety) is shown in the data visualization region 107 and corresponds to the phrases 340 and 356. In accordance with some implementations, the user interface 100 in FIG. 3F is the same as the user interface 100 in FIG. 2B, as the same phrases are active in both figures.

Figure 3G:
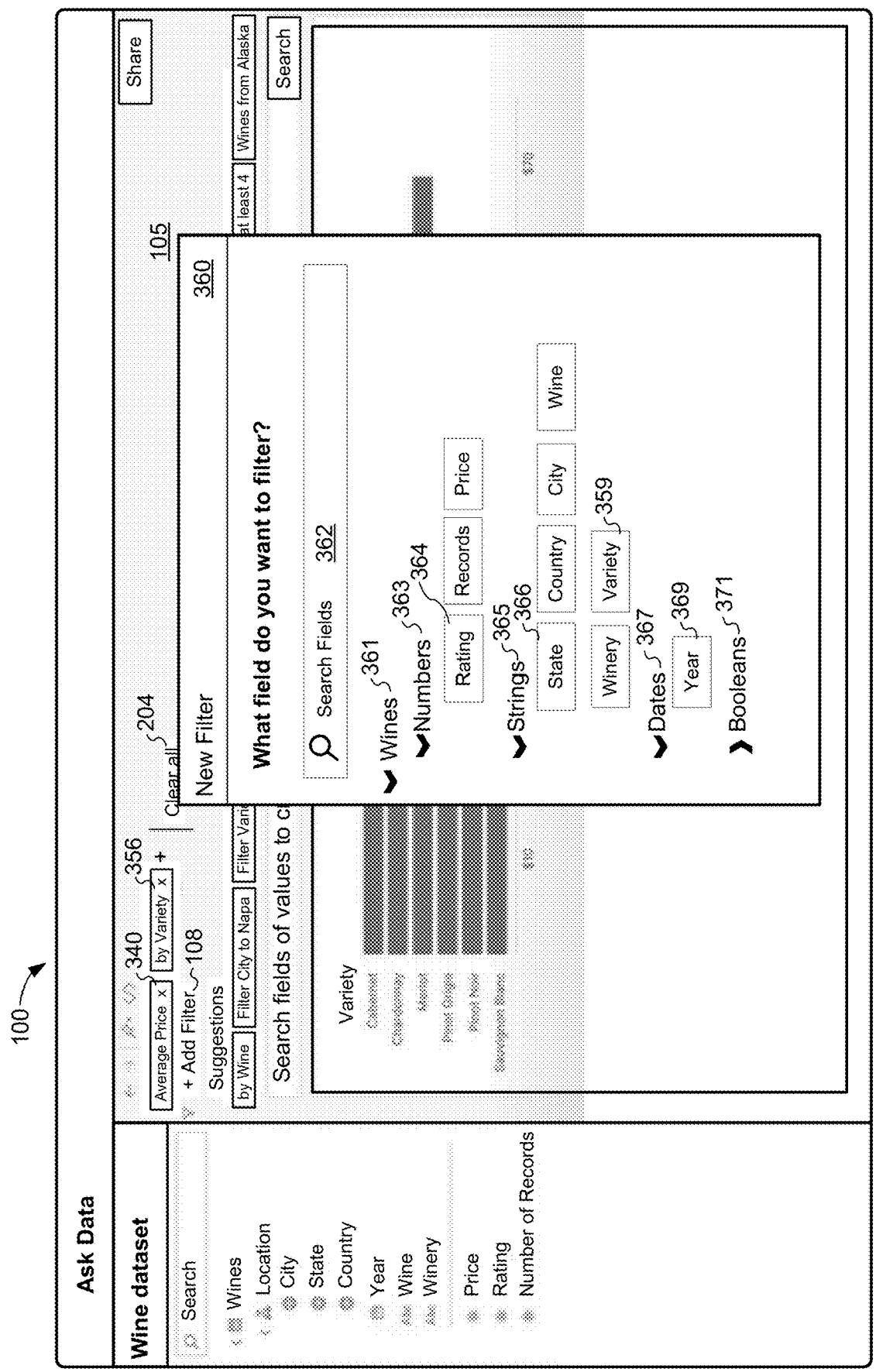

FIG. 3G illustrates the graphical user interface 100 in accordance with some implementations. In the example of FIG. 3G, a new filter menu 360 (e.g., a window or pane within the user interface 100) is shown in response to a user selecting the add filter affordance 108. In accordance with some implementations, the new filter menu 360 assists a user with constructing a valid phrase for the visualization region 107. The new filter menu 360 includes an indicator 361 for the selected dataset 104 and groupings of selected fields (e.g., by field type) from the selected dataset 104. The groupings include a numbers grouping 363, a strings grouping 365, a dates grouping 367, and a Booleans grouping 371. The numbers grouping 363 includes a rating field 364, a records field, and a price field. The strings grouping 365 includes a state field 366, a country field, a city field, a wine field, a winery field, and a variety field 359. The dates grouping 367 includes a year field 369. The new filter menu 360 also includes a search field 362 to enable a user to input search terms for fields for constructing the phrase, e.g., available and valid fields.

Figure 3H:
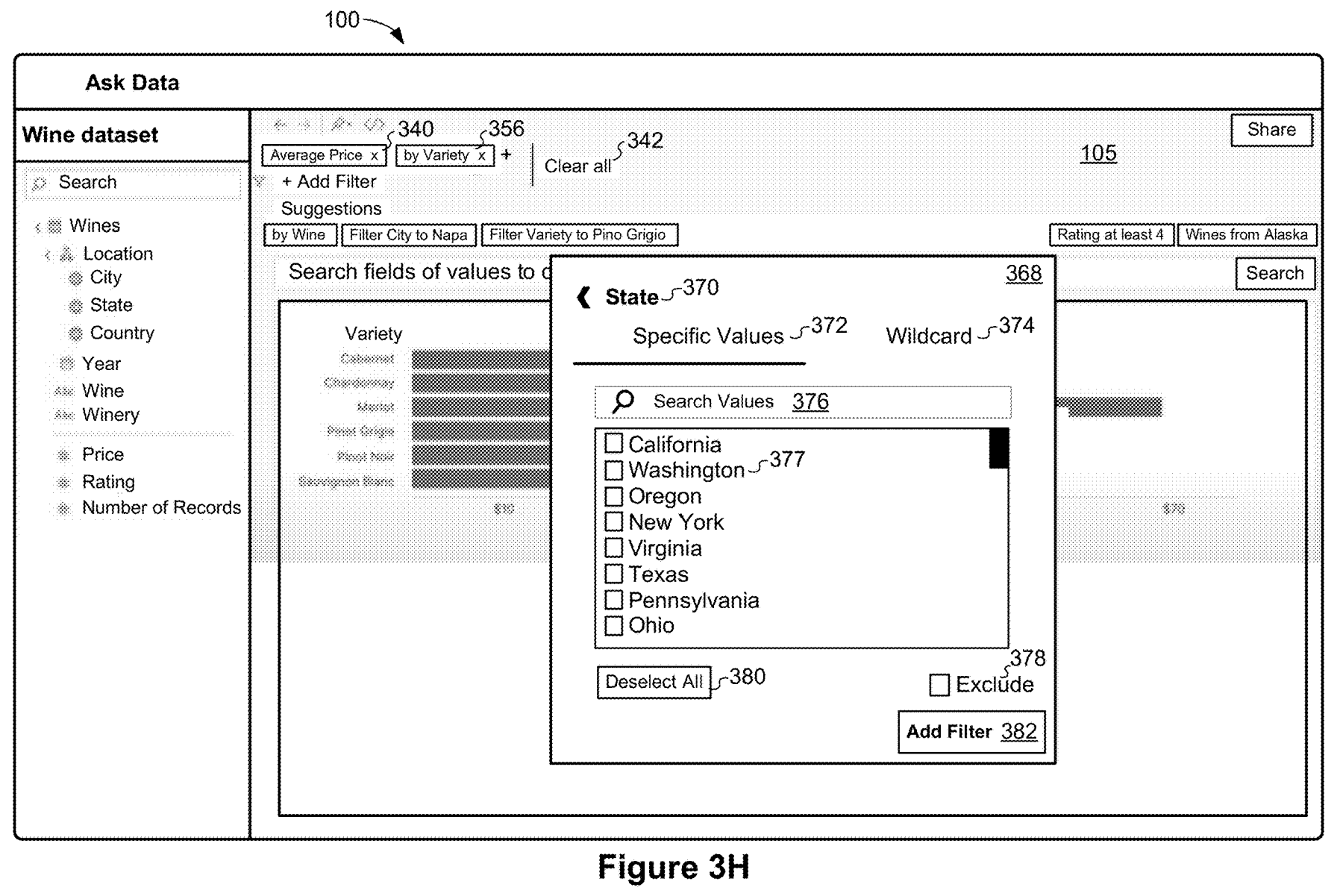

FIG. 3H illustrates the graphical user interface 100 in accordance with some implementations. In the example of FIG. 3H, a select value menu 368 is shown in response to a user selecting the state field 366 from the new filter menu 360 in FIG. 3G, as indicated by the state label 370. The select value menu 368 includes valid filter values for the state field 366. The valid filter values include the Washington state value 377. In accordance with some implementations, the filter values are arranged based on an estimated likelihood of use (e.g., based on historical usage with phrases or fields used in the active data visualization). The select value menu 368 also includes a search field 376, a deselect all affordance 380, an exclude affordance 378, an add phrase affordance 332. The search field 376 allows a user to input search terms for valid values. The deselect all affordance 380 allows a user to deselect previously selected field values. The exclude affordance 378 allows a user to construct a filter that excludes the selected filter values. The select value menu 368 includes a specific values tab 372 and a wildcard tab 374. The specific values tab 372 is the active tab in the example of FIG. 3H. An example of the wildcard tab 374 is shown in FIG. 4C and described later.

Figure 3I:
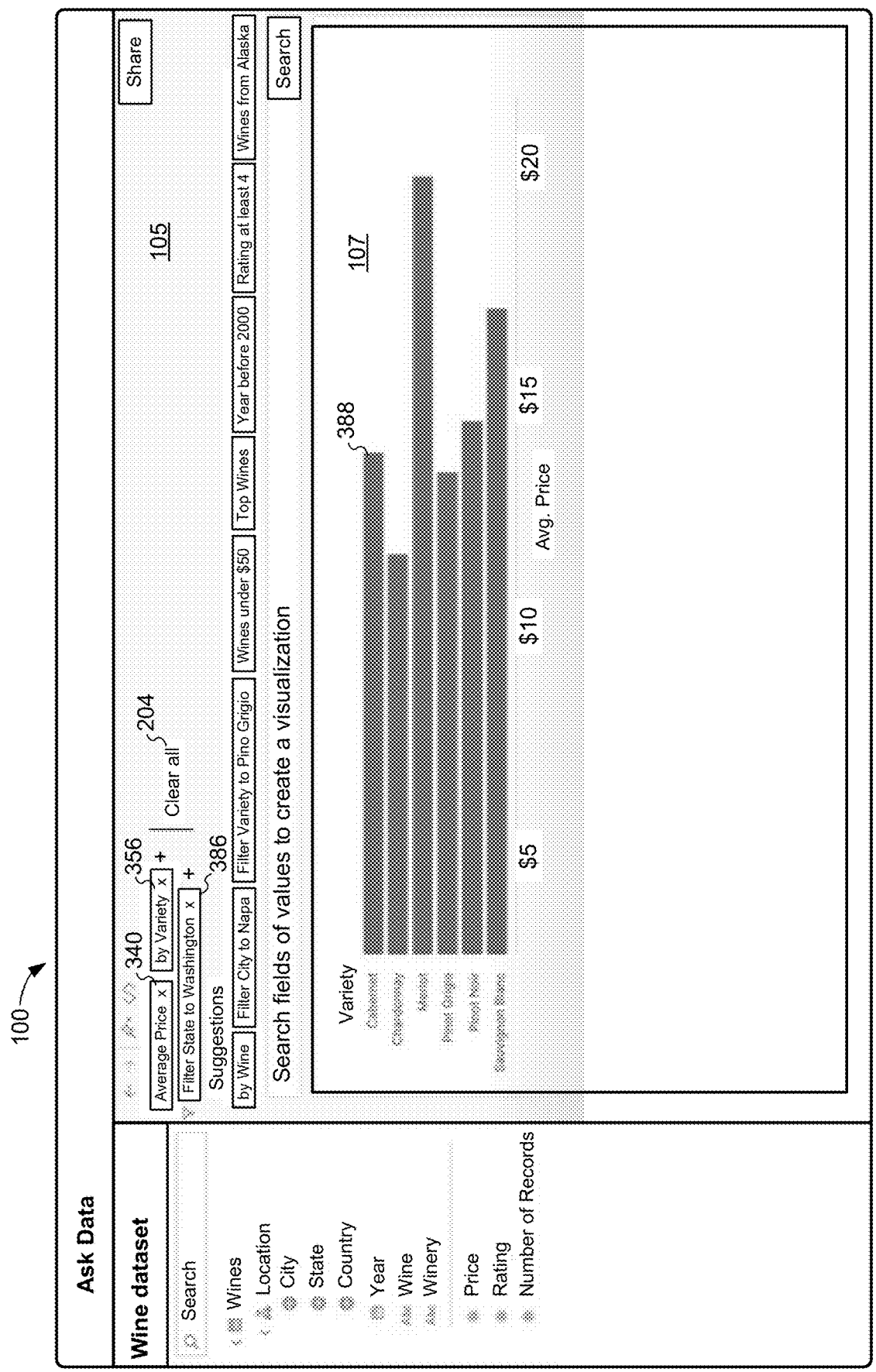

FIG. 3I illustrates the graphical user interface 100 in accordance with some implementations. In the example of FIG. 3I the 'Filter State to Washington' phrase 386 has been construction in accordance with a user selection of the Washington state value 377 and the add filter affordance 382 from FIG. 3H. FIG. 3I further shows a clear all affordance 204 to clear the active phrases. An updated data visualization 388 (e.g., a bar chart of average price by variety for the state of Washington) is shown in the data visualization region 107 and corresponds to the active phrases 340, 356, and 386.

Figure 4A:
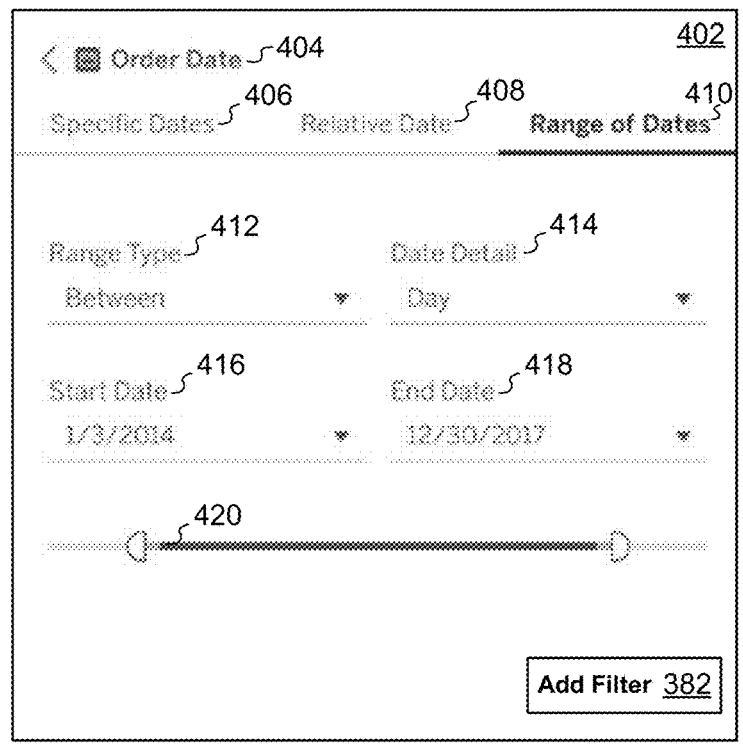
FIGS. 4A-4D illustrate example graphical user interfaces in accordance with some implementations.
Figure 4B:
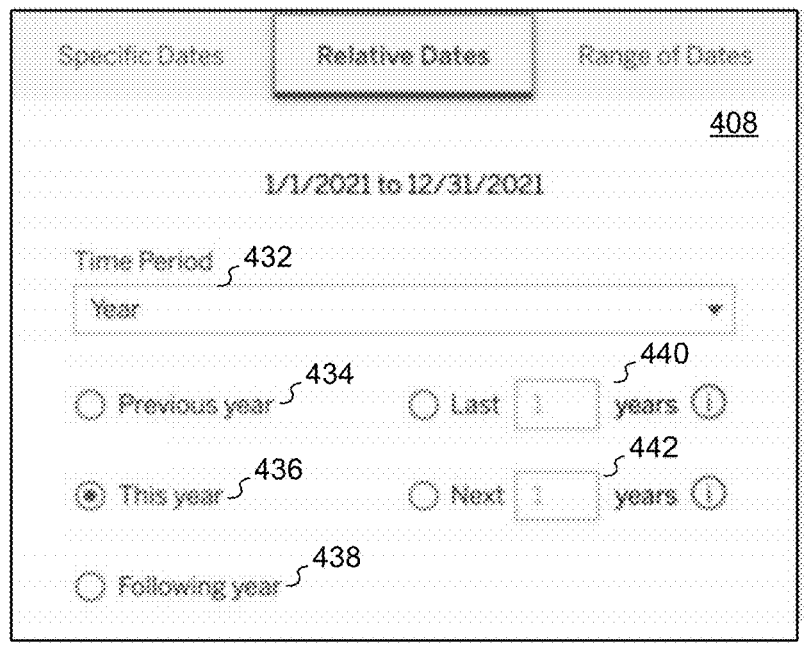

FIG. 4A shows a date filter menu 402 in accordance with some implementations. The date filter menu 402 corresponds to a user selecting an order date field for filtering, as indicated by the order date label 404. The date filter menu 402 includes a specific dates tab 406, a relative date tab 408 and a range of dates tab 410. The range of dates tab is active in FIG. 4A and includes a range type affordance 412, a date detail affordance 414, a start date affordance 416, an end date affordance 418, and a date timeline affordance 420. The range type affordance allows a user to select a range operator, such as between, before, after, and the like. The date detail affordance 414 allows a user to select a level of detail for the date range, such as day, month, year, and the like. The date timeline affordance 420 allows a user to visually adjust the start and end dates of the date range. The date filter menu 402 further includes the add filter affordance 382 to generate a valid phrase with the specified range of dates. FIG. 4B shows the relative dates tab 408 of the date filter menu 402 in accordance with some implementations. The relative dates tab 408 is active in FIG. 4B and includes a time period affordance 432, and year affordances 434, 436, and 438.

Figure 4C:
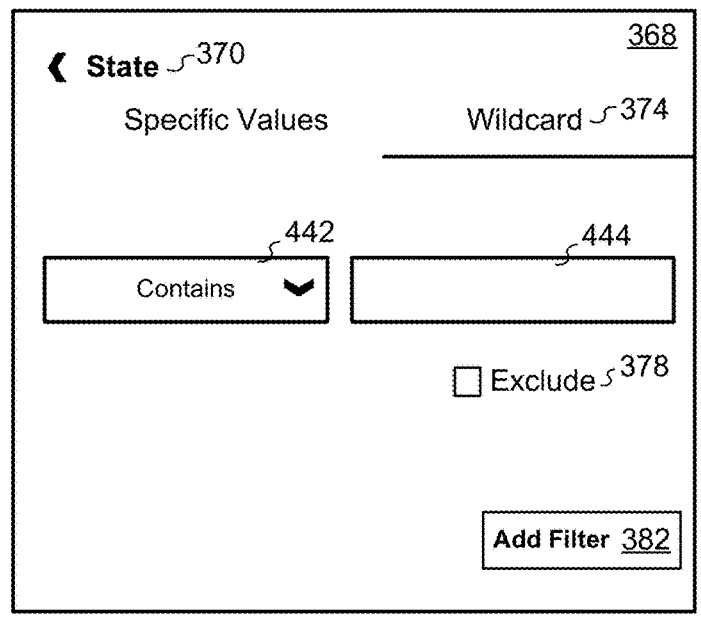

FIG. 4C illustrates the select value menu 368 with the wildcard tab 374 as the active tab in accordance with some implementations. As shown in FIG. 4C, the wildcard tab 374 includes an operator affordance 442, a wildcard field 444, the exclude affordance 378, and the add filter affordance 382. The operator affordance 442 allows a user to select a wildcard operator, such as contains, starts with, ends with, and the like. The wildcard field 444 allows a user to enter characters or strings for the wildcard operator.

Figure 4D:
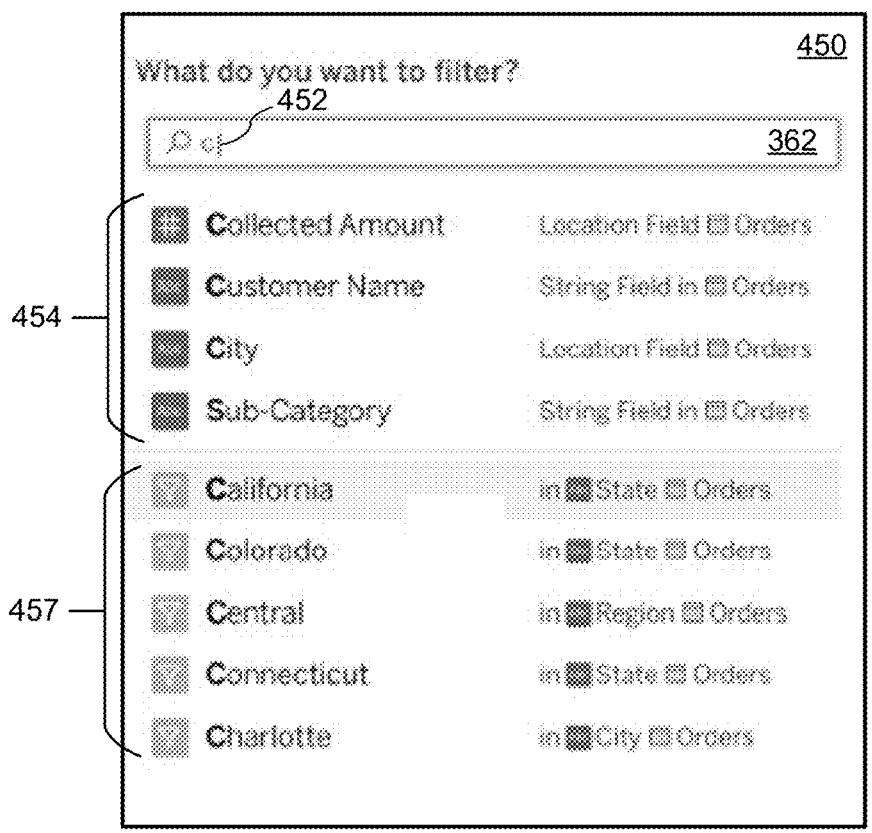

FIG. 4D illustrates a search filter menu 450 in accordance with some implementations. The search filter menu 450 shows a user input 452 in the search field 362. In the example of FIG. 4D the user input 452 is the letter 'c' and the search filter menu 450 shows a plurality of fields 454 and a plurality of values 457 that begin with the letter 'c'. In this way, the search filter menu 450 provides valid query completions that correspond to the user's input.

Figure 5A:
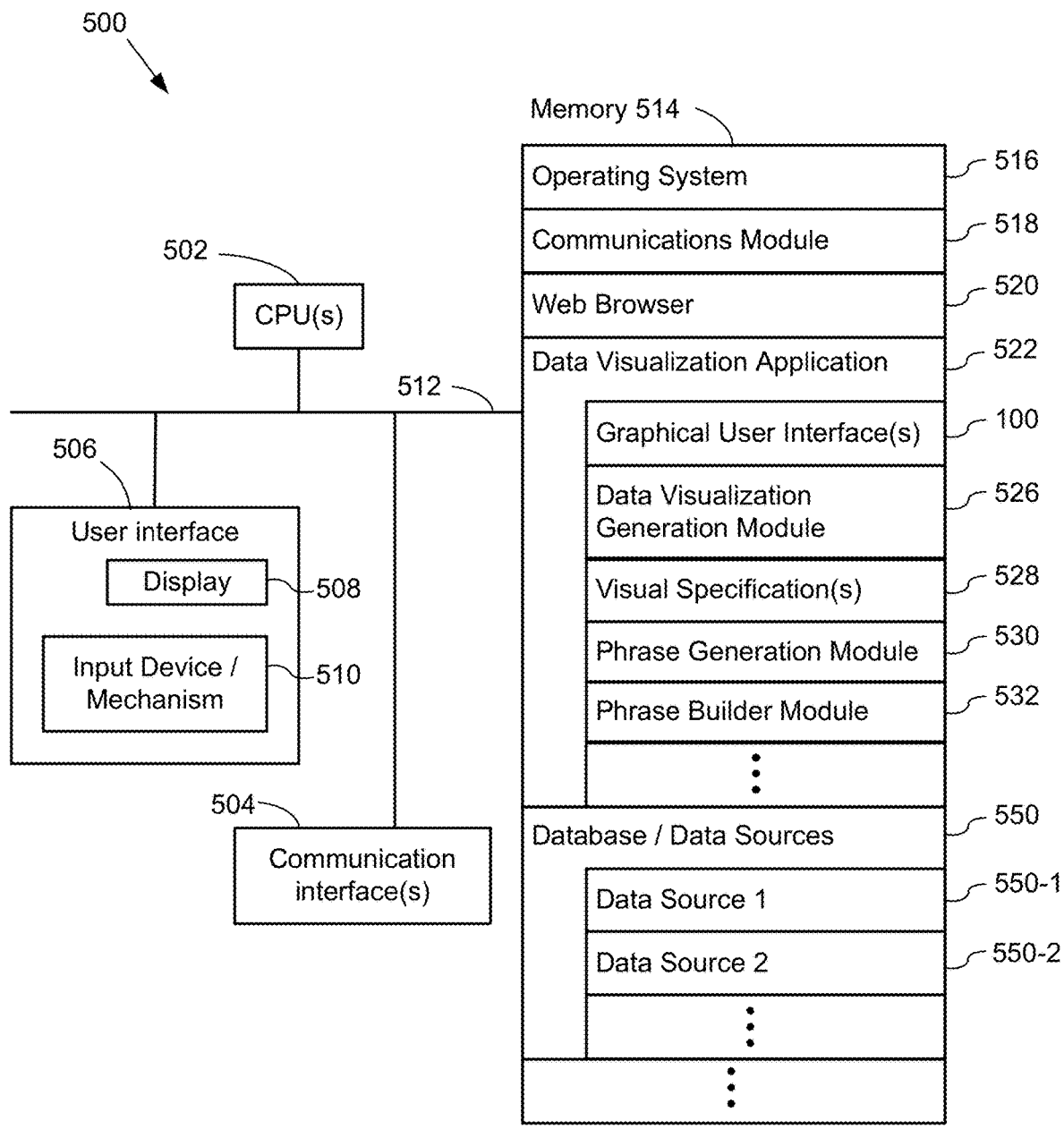
FIGS. 5A-5B are block diagrams of an example computing device in accordance with some implementations.
Figure 5B:
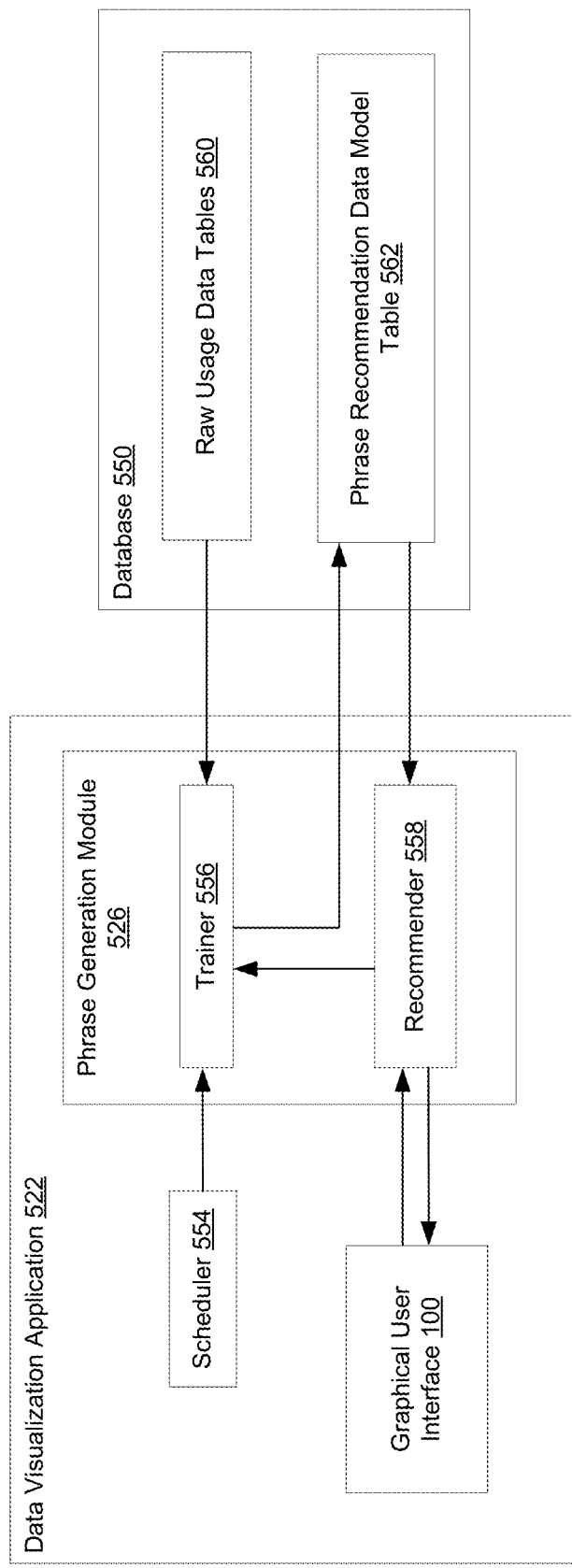
Figure 6A:
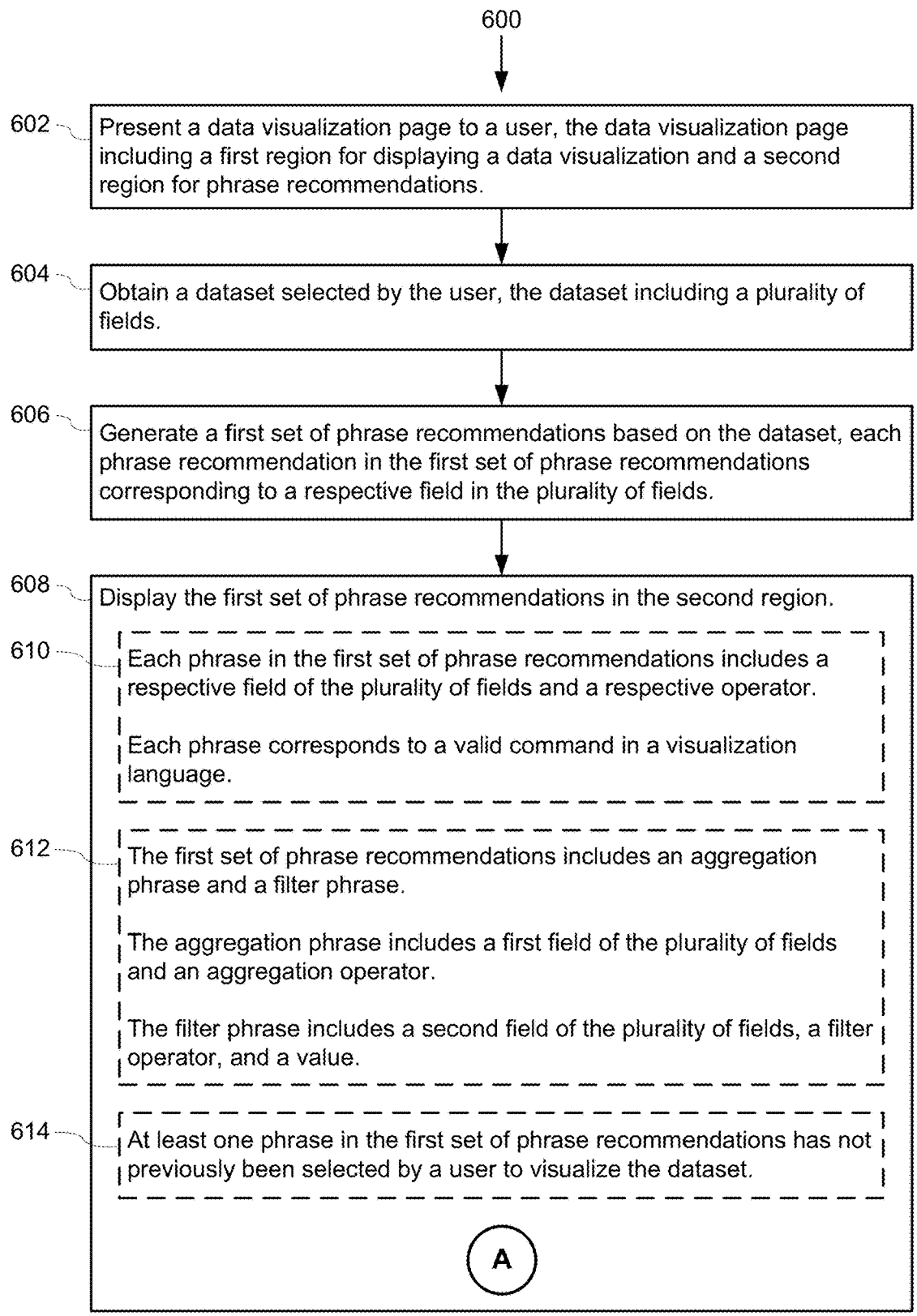
FIGS. 6A-6D provide a flowchart of an example process for recommending phrases in accordance with some implementations.
Figure 6B:
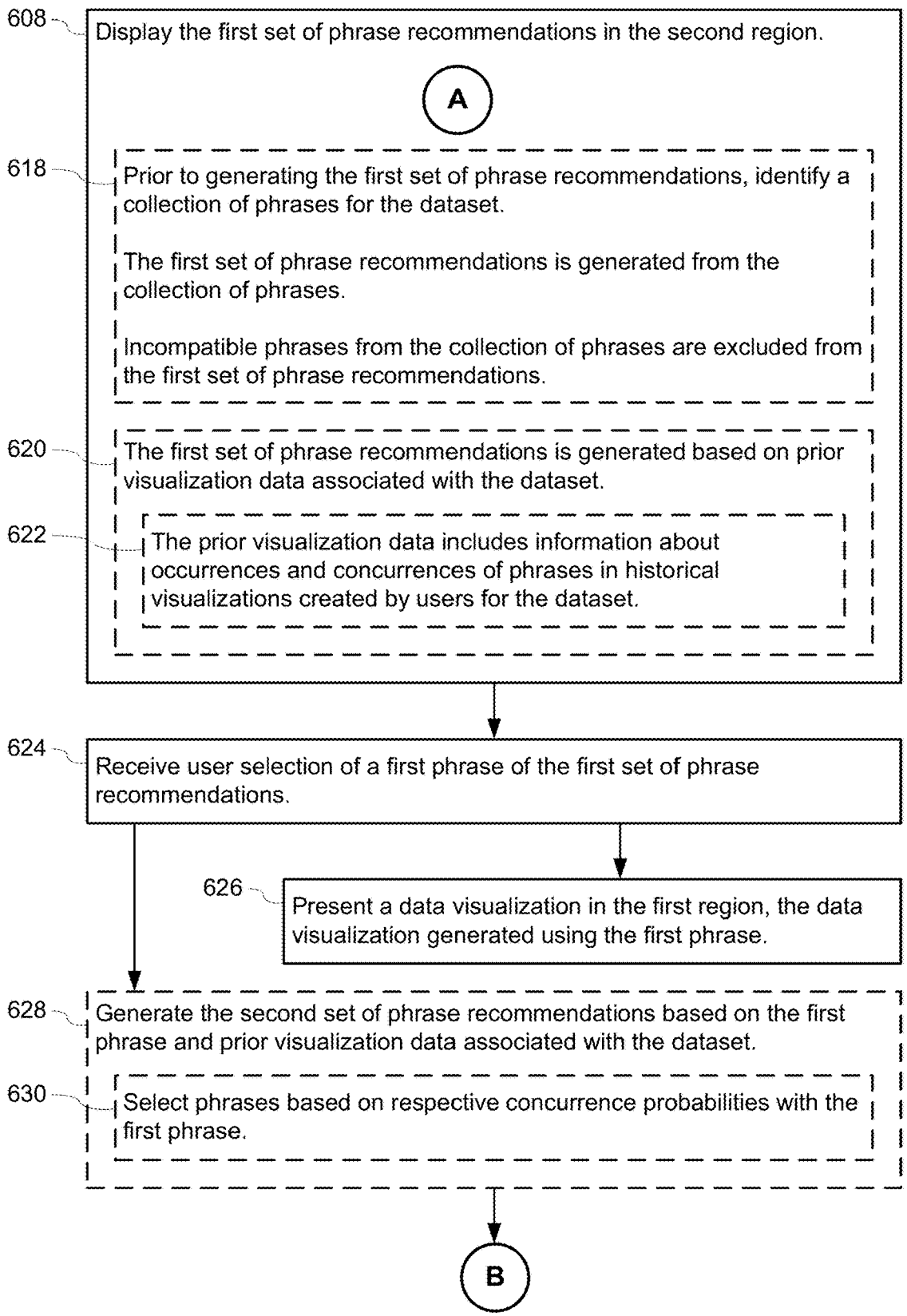
Figure 6C:
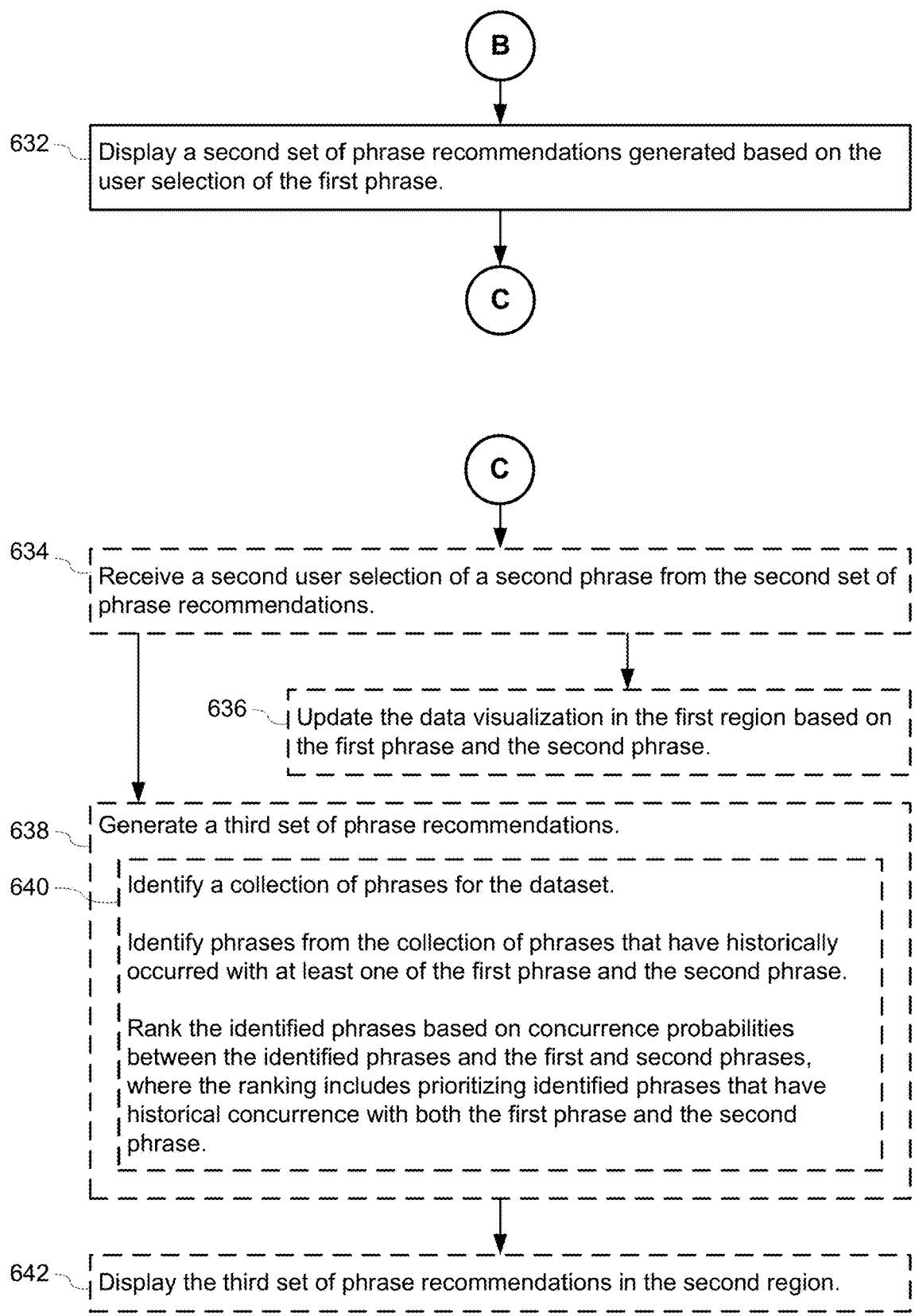
Figure 6D:
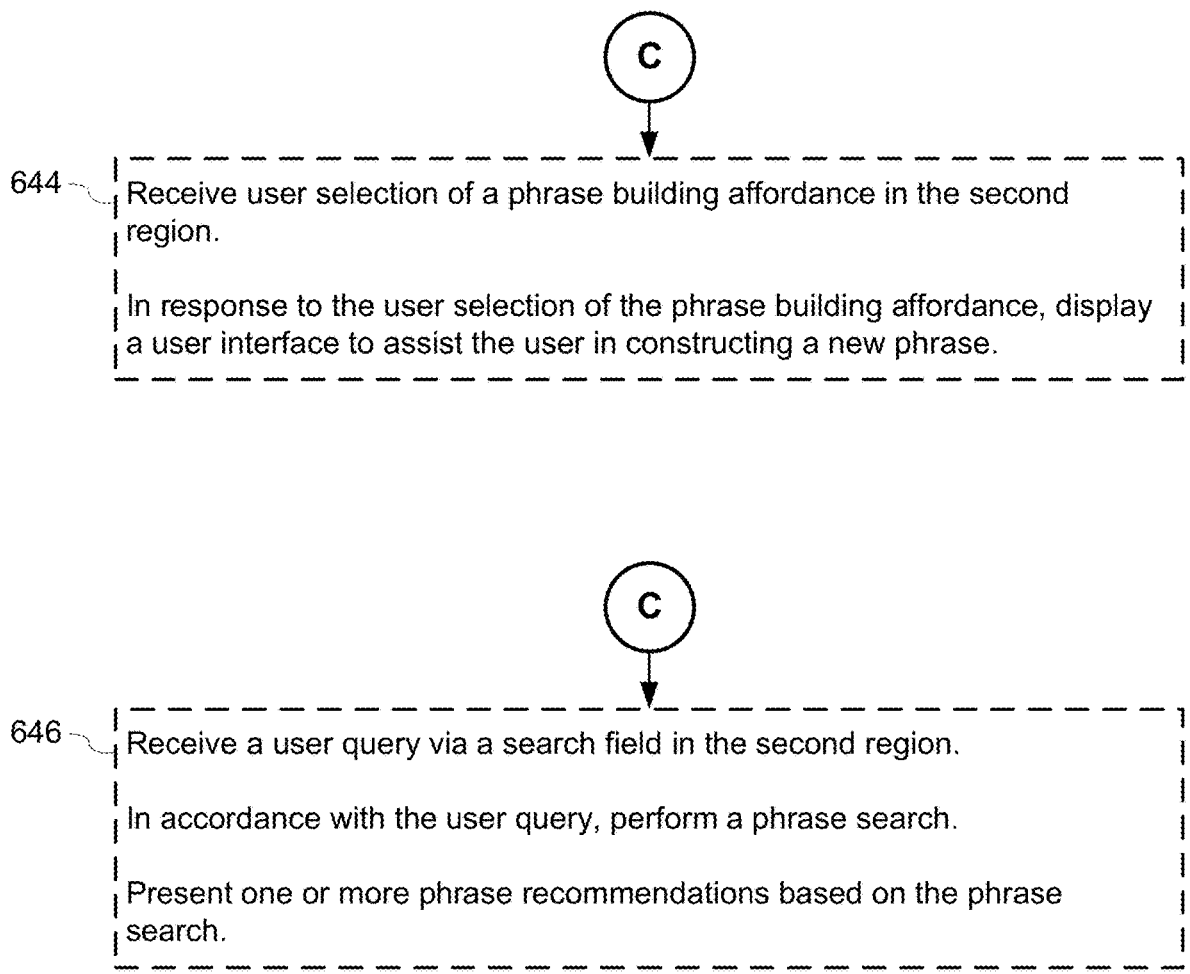
Figure 7A:
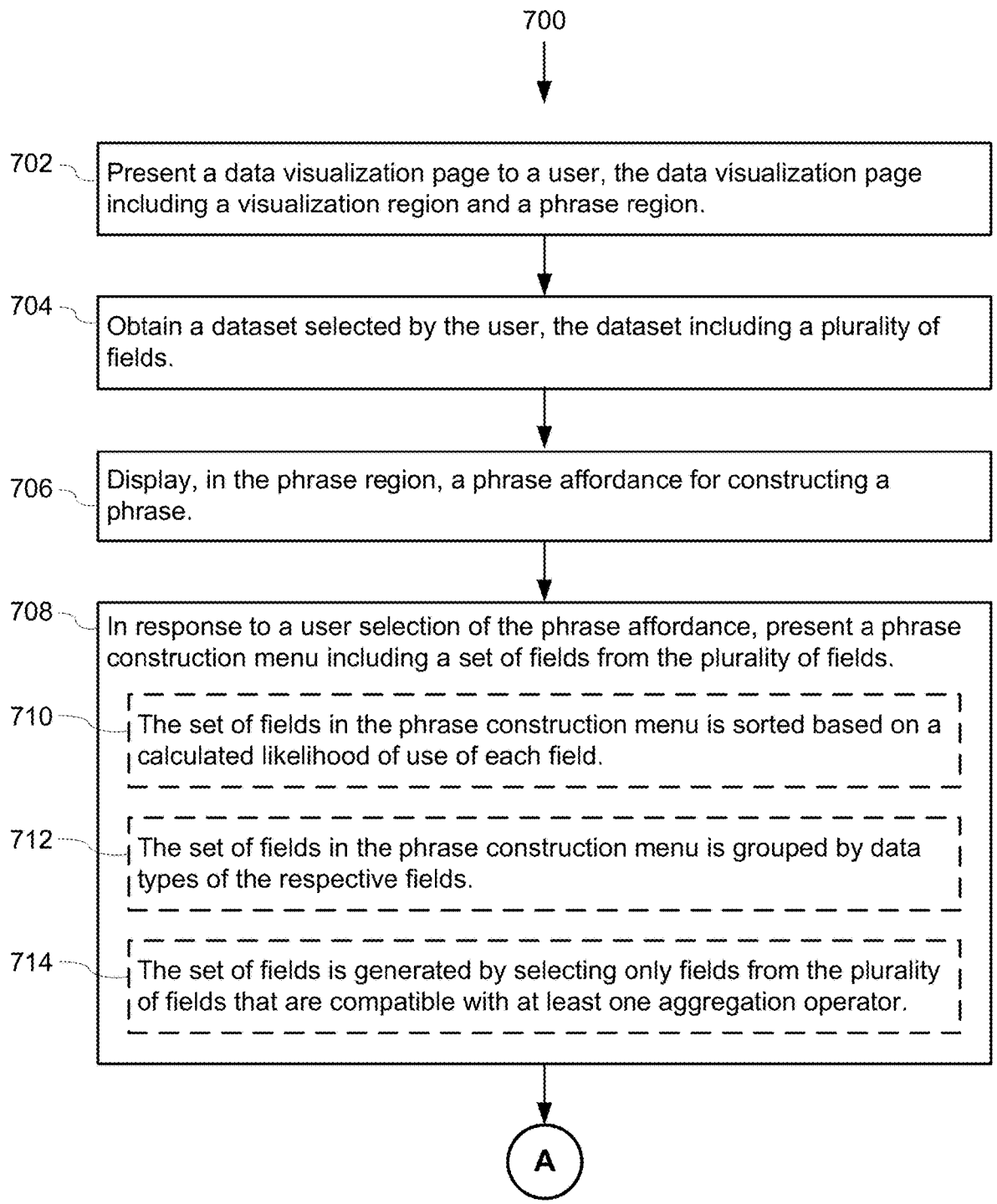
FIGS. 7A-7E provide a flowchart of an example process for building phrases in accordance with some implementations.
Figure 7B:
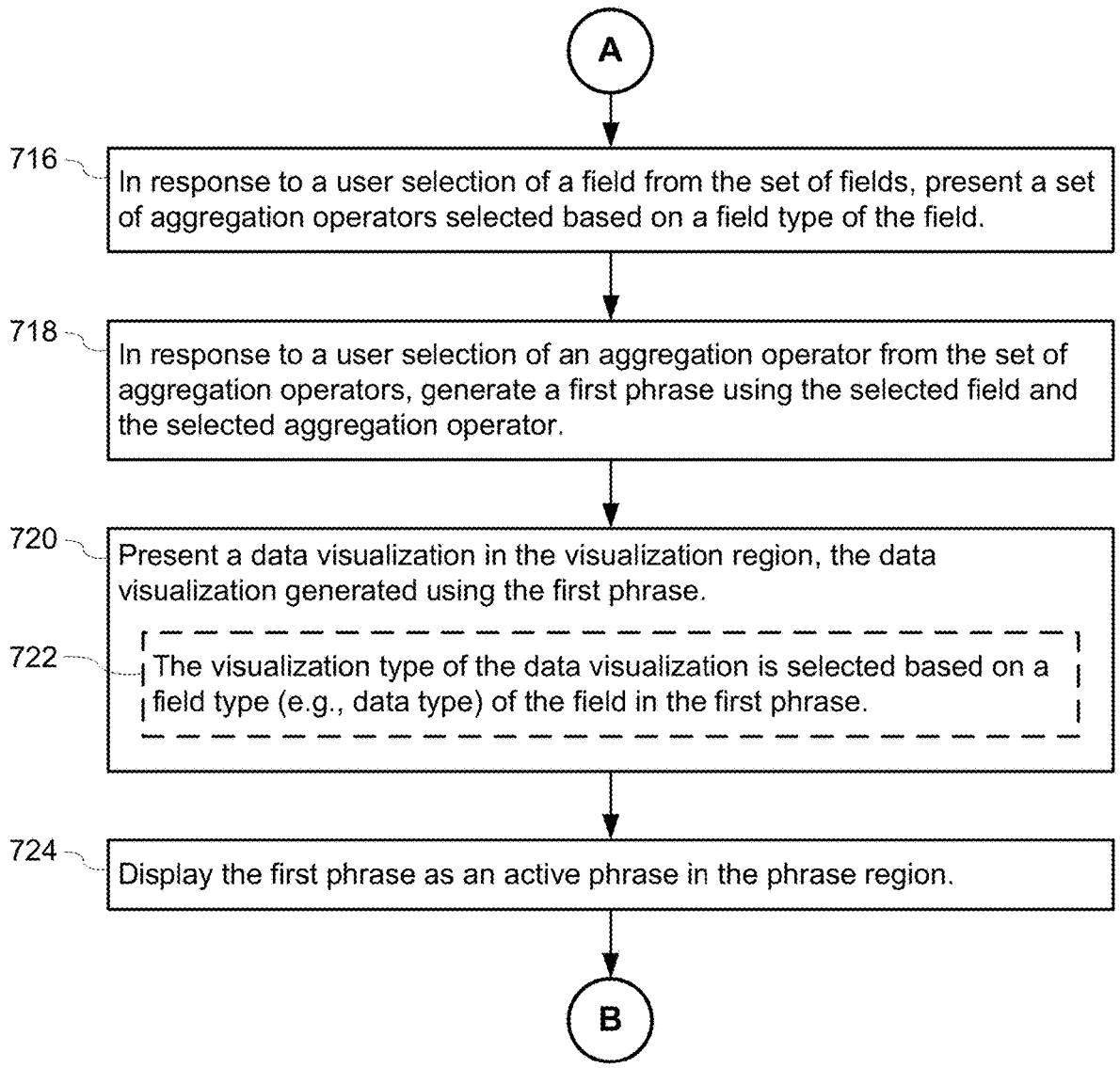
Figure 7C:
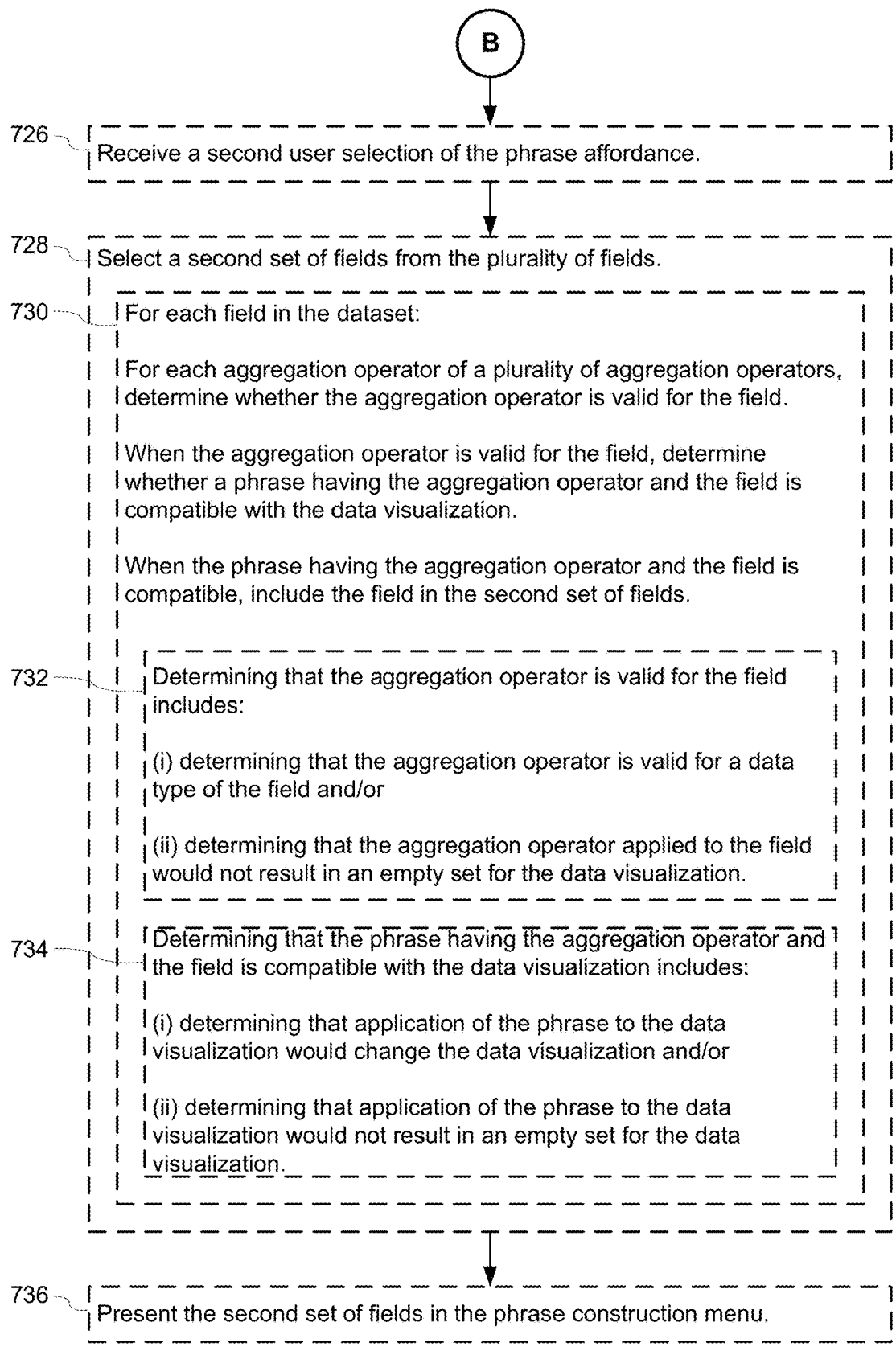
Figure 7D:
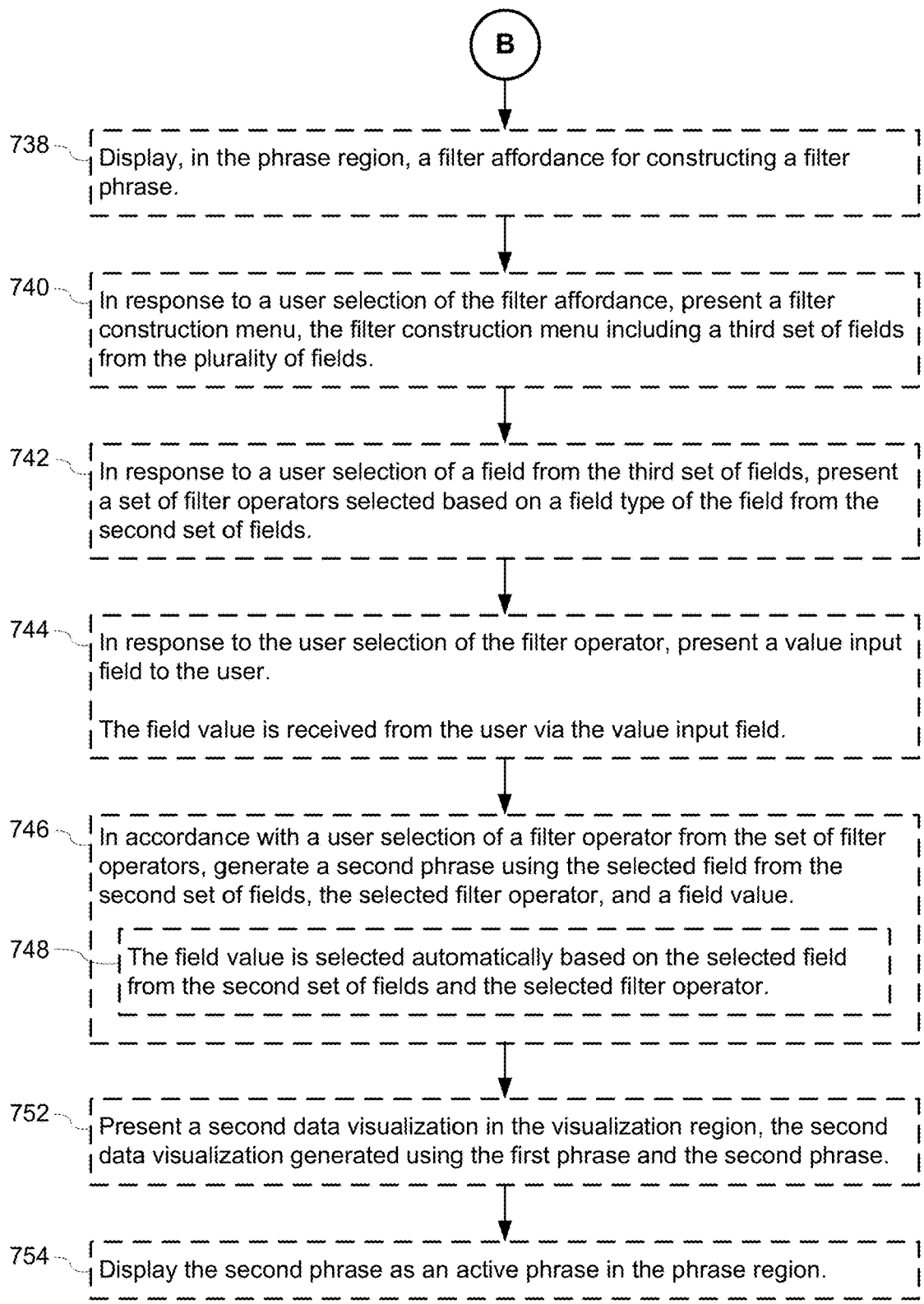
Figure 7E:
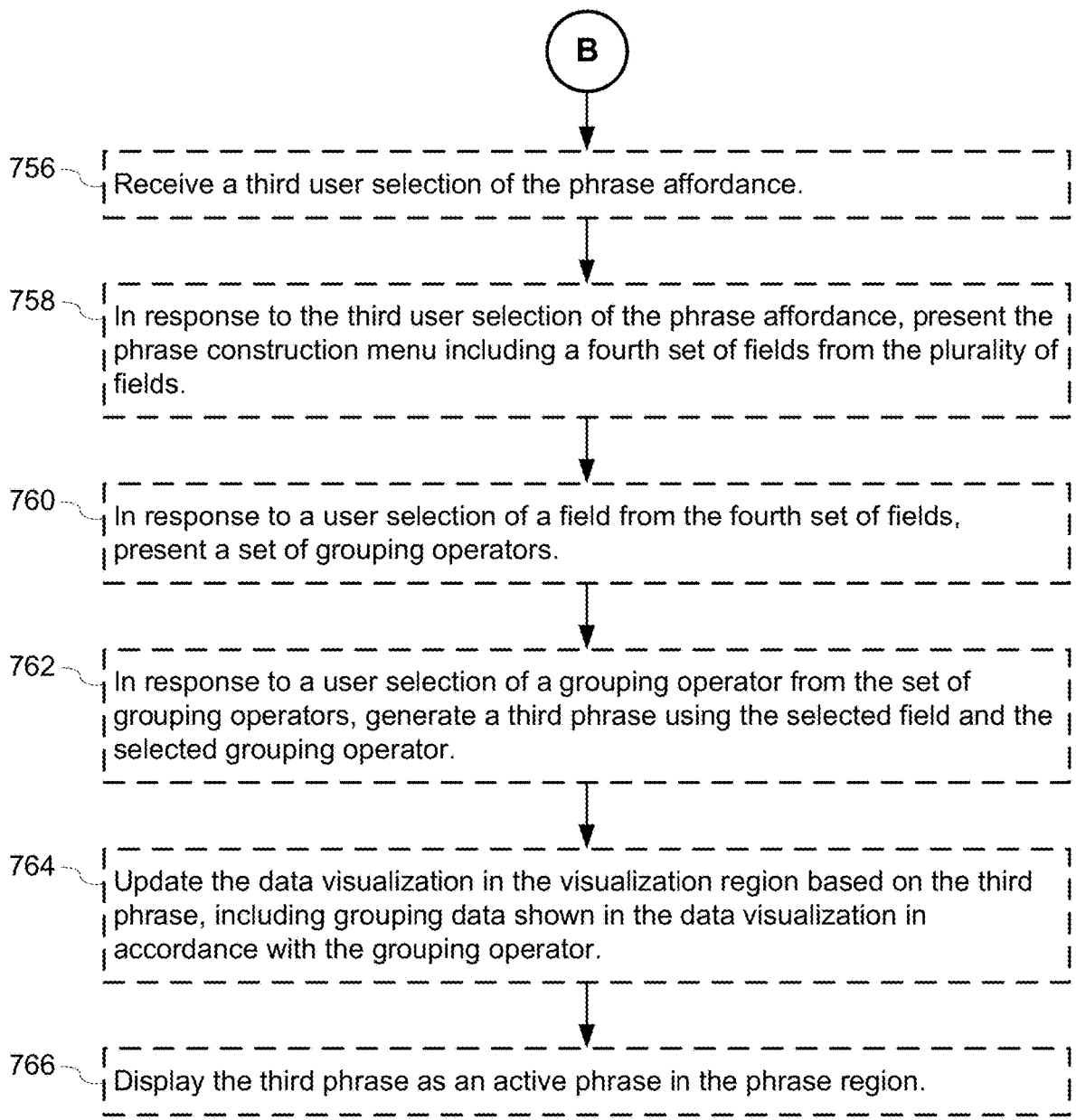

FIGS. 5A-5B are block diagrams of a computing device 500 in accordance with some implementations. Various examples of the computing device 500 include a desktop computer, a laptop computer, a tablet computer, a server computer, and other computing devices that have a processor capable of running the data visualization application 552. The computing device 500 typically includes one or more processing units/cores (CPUs) 502 for executing modules, programs, and/or instructions stored in the memory 514 and thereby performing processing operations; one or more network or other communications interfaces 504; memory 514; and one or more communication buses 512 for interconnecting these components. The communication buses 512 may include circuitry that interconnects and controls communications between system components.

The computing device 500 optionally includes a user interface 506 comprising a display device 508 and one or more input devices or mechanisms 510. In some implementations, the input device/mechanism includes a keyboard. In some implementations, the input device/mechanism includes a "soft" keyboard, which is displayed as needed on the display device 508, enabling a user to "press keys" that appear on the display 508. In some implementations, the display 508 and input device/mechanism 510 comprise a touch screen display (also called a touch sensitive display).

In some implementations, the memory 514 includes high-speed random-access memory, such as DRAM, SRAM, DDR RAM or other random-access solid-state memory devices. In some implementations, the memory 514 includes non-volatile memory, such as one or more magnetic disk storage devices, optical disk storage devices, flash memory devices, or other non-volatile solid state storage devices. In some implementations, the memory 514 includes one or more storage devices remotely located from the CPU(s) 502. The memory 514, or alternately the non-volatile memory device(s) within the memory 514, comprises a non-transitory computer-readable storage medium. In some implementations, the memory 514, or the computer-readable storage medium of the memory 514, stores the following programs, modules, and data structures, or a subset thereof:

- an operating system 516, which includes procedures for handling various basic system services and for performing hardware dependent tasks;
- a communications module 518, which is used for connecting the computing device 500 to other computers and devices via the one or more communication network interfaces 504 (wired or wireless) and one or more communication networks, such as the Internet, other wide area networks, local area networks, metropolitan area networks, and so on;

a web browser 520 (or other application capable of displaying web pages), which enables a user to communicate over a network with remote computers or devices;

a data visualization application 522, which provides tools and the graphical user interface 100 for a user to construct visual graphics. For example, a user selects one or more data sources 550 (which may be stored on the computing device 500 or stored remotely), selects phrase recommendations, and is shown a visual graphic corresponding to selected recommendations. The data visualization application 522 includes a phrase generation module 530 that recommends phrases to a user based on historical usage information. The data visualization application 522 includes a phrase builder module 532 that recommends fields, operators, and values to a user, e.g., based on historical usage information. In some implementations, the information the phrases user selects or constructs are stored as a visual specification 528. The data visualization application 522 includes a data visualization generation module 526, which takes the user selections and generates a corresponding visual graphic (also referred to as a "data visualization" or a "data viz"). The data visualization application 522 then displays the generated visual graphic in the user interface 100. In some implementations, the data visualization application 522 executes as a standalone application (e.g., a desktop application). In some implementations, the data visualization application 522 executes within the web browser 520 or another application using web pages provided by a web server; and one or more databases 550 (e.g., a first data source 550-1 and a second data source 550-2), which are used by the application 522. In some implementations, the data sources are stored as spreadsheet files, CSV files, XML, files, or flat files, or stored in a relational database.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 514 stores a subset of the modules and data structures identified above. Furthermore, the memory 514 may store additional modules or data structures not described above.

Although FIG. 5A shows a computing device 500, FIG. 5A is intended more as a functional description of the various features that may be present rather than as a structural schematic of the implementations described herein. In practice, and as recognized by those of ordinary skill in the art, items shown separately could be combined and some items could be separated.

FIG. 5B shows example interaction between the data visualization application 522 and the database 550. In accordance with some implementations, the phrase generation module 530 includes a trainer module 556 and a recommender module 558. In accordance with some implementations, the database 550 includes one or more raw usage data tables 560 and a phrase recommendation data model table 562. The recommender module 558 communicates with the graphical user interface 100 (e.g., via API calls) to provide phrase, field, and operator recommendations in accordance with user inputs in the user interface 100. The recommender module 558 also communicates with the trainer module 556, e.g., to train a new recommendation model or update an existing recommendation model. The recommender module 558 communicates with the database 550 to obtain recommendation data from the model table 562. In accordance with some implementations, the recommender module 558 uses the recommendation data to generate or identify one or more phrase, field, or operator recommendations to display on the user interface 100. The trainer module 556 communicates with a scheduler 554, e.g., to periodically update a recommendation model. The trainer module 556 also communicates with the database 550 to obtain raw usage data from the data tables 560. In accordance with some implementations, the trainer module 556 generates, or updates, phrase recommendation models based on the raw usage data. The trainer module 556 sends the trained models to the database 550 to be stored in the model table 562. In some implementations, the data visualization application 552, or portions of it (such as the phrase generation module 530), are part of a server system (e.g., a natural language processing server) separate from the user computing device 500.

FIGS. 6A-6D provide a flowchart of an example process for recommending phrases in accordance with some implementations. The method 600 is performed at a computing system (e.g., the computing device 500) having a display, one or more processors, and memory. In some implementations, the computing system comprises a computing device and a server system. In some implementations, the memory stores one or more programs configured for execution by the one or more processors.

The computing system presents (602) a data visualization page (e.g., the user interface 100) to a user, the data visualization page including a first region for displaying a data visualization (e.g., the visualization region 107) and a second region for phrase recommendations (e.g., the phrase region 105). The system obtains (604) a dataset selected by the user (e.g., the selected dataset 104), the dataset including a plurality of fields.

The system generates (606) a first set of phrase recommendations based on the dataset (e.g., the phrase recommendations 112), each phrase recommendation in the first set of phrase recommendations corresponding to a respective field in the plurality of fields.

The system displays (608) the first set of phrase recommendations in the second region. For example, in FIG. 1, the first set of phrase recommendations are shown as the suggestions 110 in the phrase region 105.

In some implementations, each phrase in the first set of phrase recommendations includes (610) a respective field of the plurality of fields and a respective operator; and each phrase corresponds to a valid command in a visualization language.

In some implementations, the first set of phrase recommendations includes (612) an aggregation phrase and a filter phrase. The aggregation phrase includes a first field of the plurality of fields and an aggregation operator. The filter phrase includes a second field of the plurality of fields, a filter operator, and a value. The 'Average Price' phrase recommendation 112-1 is an example of an aggregation phrase. The 'Filter Variety to Pino Grigio' phrase recommendation 112-4 is an example of a filter phrase.

In some implementations, at least one phrase in the first set of phrase recommendations has not previously been selected (614) by a user to visualize the dataset. For example, the phrase 'Wines under $50' may not have been previously selected by a user, but the phrase recommendation 112-3 is included based on machine learning performed on the dataset, potential data visualizations, and/or user preferences.

In some implementations, prior to generating the first set of phrase recommendations, the system identifies (618) a collection of phrases for the dataset (e.g., all possible phrases for the dataset). The first set of phrase recommendations is generated from the collection of phrases. Incompatible phrases from the collection of phrases are excluded from the first set of phrase recommendations. For example, if the phrase 'Average Price' is incompatible with 'Mean Price,' only one of the phrases will be recommended.

In some implementations, the first set of phrase recommendations are generated (620) based on prior visualization data associated with the dataset. For example, the phrase recommendations are selected based on historical data visualizations constructed by users to visualize the dataset. As a particular example, if a user previously created a chart of origin city versus average price for the wine dataset, the phrase recommendations for a subsequent user may include 'Origin City' and 'Average Price' phrases. In some implementations, the prior visualization data includes (622) information about occurrences and concurrences of phrases in historical visualizations created by users for the dataset.

The system receives (624) a user selection of a first phrase of the first set of phrase recommendations. For example, FIG. 2 shows a user selection of the 'Average Price' phrase recommendation 112-1.

The system presents (626) a data visualization in the first region, the data visualization generated using the first phrase. For example, FIG. 2 shows the data visualization 208 displayed in the data visualization region 107 in response to the user selection of the 'Average Price' phrase recommendation 112-1.

In some implementations, the system generates (628) the second set of phrase recommendations based on the first phrase and prior visualization data associated with the dataset. In some implementations, generating the second set of phrase recommendations includes adding one or more recommendations to the first set of phrase recommendations. In some implementations, generating the second set of phrase recommendations includes re-ranking the first set of phrase recommendations. In some implementations, the system selects (630) phrases based on respective concurrence probabilities with the first phrase.

The system displays (632) a second set of phrase recommendations generated based on the user selection of the first phrase. For example, FIG. 2 shows the suggestions 110 includes a second set of phrase recommendations that include the 'by Wine' phrase recommendation 206-1 and the 'Year before 2000' phrase recommendation 206-2 added to the first set of phrase recommendations shown in FIG. 1. FIG. 2 further shows the second set of phrase recommendations sorted differently than the first set of phrase recommendations shown in FIG. 1.

In some implementations, the system receives (634) a second user selection of a second phrase from the second set of phrase recommendations. For example, FIG. 3 shows that the 'by Variety' phrase recommendation 112-2 has been selected for the second set of phrase recommendations shown in FIG. 2.

In some implementations, the system updates (636) the data visualization in the first region based on the first phrase and the second phrase. For example, FIG. 2B shows that the data visualization 208 shown in FIG. 2A has been replaced with the data visualization 226, which corresponds to the active phrases 202-1 and 202-2. In some implementations, the system generates (638) a third set of phrase recommendations.

In some implementations, the system identifies (640) a collection of phrases for the dataset. The system identifies phrases from the collection of phrases that have historically occurred with at least one of the first phrase and the second phrase. The system ranks the identified phrases based on concurrence probabilities between the identified phrases and the first and second phrases, where the ranking includes prioritizing identified phrases that have historical concurrence with both the first phrase and the second phrase.

In some implementations, the system displays (642) the third set of phrase recommendations in the second region. For example, FIG. 3 shows the suggestions 110 includes a third set of phrase recommendations that includes the 'Top Wines' phrase recommendation 304 added to the second set of phrase recommendations shown in FIG. 2. FIG. 3 further shows the third set of phrase recommendations sorted differently than the second set of phrase recommendations shown in FIG. 2.

In some implementations, the system receives (644) a user selection of a phrase building affordance (e.g., the add field affordance 106) in the second region. In response to the user selection of the phrase building affordance, the system displays a user interface to assist the user in constructing a new phrase.

In some implementations, the system receives (646) a user query (e.g., the search phrase 210) via a search field (e.g., the search field 114) in the second region. In accordance with the user query, the system performs a phrase search. The system presents one or more phrase recommendations based on the phrase search.

FIGS. 7A-7E provide a flowchart of an example process for building phrases in accordance with some implementations. The method 700 is performed at a computing system (e.g., the computing device 500) having a display, one or more processors, and memory. In some implementations, the computing system comprises a computing device and a server system. In some implementations, the memory stores one or more programs configured for execution by the one or more processors.

The computing system presents (702) a data visualization page (e.g., the user interface 100) to a user, the data visualization page including a visualization region (e.g., the visualization region 107) and a phrase region (e.g., the phrase region 105). The system obtains (704) a dataset selected by the user (e.g., the selected dataset 104), the dataset including a plurality of fields.

The system displays (706), in the phrase region, a phrase affordance for constructing a phrase. For example, FIG. 1 shows an add field affordance 106 and an add filter affordance 108.

The system presents (708) a phrase construction menu including a set of fields from the plurality of fields in response to a user selection of the phrase affordance. For example, FIG. 3A shows the new field menu 302 displayed in response to a user selection of the add field affordance 106.

In some implementations, the set of fields in the phrase construction menu is sorted (710) based on a calculated likelihood of use of each field. In some implementations, the calculated likelihood of use is based on historical data visualizations for the dataset. For example, the likelihood of use is based on how often the field was used in prior data visualizations for the dataset. In some implementations, the calculated likelihood of use is based on user preferences of the user and/or a group of users.

In some implementations, the set of fields in the phrase construction menu are grouped (712) by data types of the respective fields. For example, FIG. 3A shows the fields in the new field menu 302 grouped by field type. In some implementations, the set of fields is generated (714) by selecting only fields from the plurality of fields that are compatible with at least one aggregation operator.

The system presents (716) a set of aggregation operators selected based on a field type of the field in response to a user selection of a field from the set of fields. For example, FIG. 3B shows the select aggregation menu 322 shown in response to a user selecting the price field 309 from the new field menu 302.

The system generates (718) a first phrase using the selected field and the selected aggregation operator in response to a user selection of an aggregation operator from the set of aggregation operators. For example, in FIG. 3C, the 'Average Price' phrase 340 has been construction in accordance with a user selection of the average operator 326 and the add phrase affordance 332 from FIG. 3B.

The system presents (720) a data visualization in the visualization region, the data visualization generated using the first phrase. For example, in FIG. 3C the data visualization 208 is shown in the data visualization region 107 and corresponds to the average price phrase 340.

In some implementations, a visualization type of the data visualization is selected (722) based on a field type of the field in the first phrase. For example, the type of data visualization is selected based on a type of data visualization historically used with the field type of the field in the first phrase.

The system displays (724) the first phrase as an active phrase in the phrase region. For example, FIG. 3C shows the 'Average Price' phrase 340 has been added as an active phrase.

In some implementations, the system receives (726) a second user selection of the phrase affordance. In some implementations, the system selects (728) a second set of fields from the plurality of fields. In some implementations, for each field in the dataset: for each aggregation operator of a plurality of aggregation operators, the system determines (730) whether the aggregation operator is valid for the field. In accordance with a determination that the aggregation operator is valid for the field, the system determines whether a phrase having the aggregation operator and the field is compatible with the data visualization. In accordance with a determination that the phrase having the aggregation operator and the field is compatible, the system includes the field in the second set of fields.

In some implementations, determining that the aggregation operator is valid for the field includes (732): determining that the aggregation operator is valid for a data type of the field, and determining that the aggregation operator applied to the field would not result in an empty set for the data visualization.

In some implementations, determining that the phrase having the aggregation operator and the field is compatible with the data visualization includes (734): determining that application of the phrase to the data visualization would change the data visualization, and determining that application of the phrase to the data visualization would not result in an empty set for the data visualization. In some implementations, the system presents (736) the second set of fields in the phrase construction menu. For example, FIG. 3D show a second set of fields presented in the new field menu 302.

In some implementations, the system displays (738), in the phrase region, a filter affordance for constructing a filter phrase. For example, FIG. 1 shows an add filter affordance 108 in the phrase region 105.

In some implementations, the system presents (740) a filter construction menu in response to a user selection of the filter affordance, the filter construction menu including a third set of fields from the plurality of fields. For example, FIG. 3G shows the new filter menu 360 shown in response to a user selecting the add filter affordance 108.

In some implementations, the system presents (742) a set of filter operators selected based on a field type of the field from the second set of fields in response to a user selection of a field from the third set of fields. For example, FIG. 4C shows the select value menu 368 with the operator affordance 442 for selecting a filter operator.

In some implementations, the system presents (744) a value input field to the user, and a field value is received from the user via the value input field. For example, FIG. 4C shows the select value menu 368 with the wildcard field 444.

In some implementations, the system generates (746) a second phrase using the selected field from the second set of fields, the selected filter operator, and the field value in accordance with a user selection of the filter operator from the set of filter operators. In some implementations, the field value is selected (748) automatically based on the selected field from the second set of fields and the selected filter operator.

In some implementations, the system presents (752) a second data visualization in the visualization region, the second data visualization generated using the first phrase and the second phrase. For example, FIG. 3I shows the data visualization 388 generated using the average price phrase 340, the by variety phrase 356, and the filter state to Washington phrase 386.

In some implementations, the system displays (754) the second phrase as an active phrase in the phrase region. For example, FIG. 3I shows the filter state to Washington phrase 386 displayed as an active phrase in the phrase region 105.

In some implementations, the system receives (756) a third user selection of the phrase affordance. In some implementations, the system presents (758) the phrase construction menu including a fourth set of fields from the plurality of fields in response to the third user selection of the phrase affordance. For example, FIG. 3D shows the new field menu 302 displayed in response to a user selection of the add field affordance 346.

In some implementations, the system presents (760) a set of grouping operators in response to a user selection of a field from the second set of fields. For example, in FIG. 3E the select aggregation menu 322 is shown in response to a user selecting the variety field 311 from the new field menu 302.

In some implementations, the system generates (762) a third phrase using the selected field and the selected grouping operator in response to a user selection of a grouping operator from the set of grouping operators. In some implementations, the system updates (764) the data visualization in the visualization region based on the third phrase, including grouping data shown in the data visualization in accordance with the grouping operator. In some implementations, the system displays (766) the third phrase as an active phrase in the phrase region. For example, in FIG. 3F, an updated data visualization 226 is shown in the data visualization region 107 and corresponds to the phrases 340 and 356.

Turning now to some example implementations.

(A1) In one aspect, some implementations include a method (e.g., the method 600) for recommending phrases for a data visualization. The method is performed at a computing device (e.g., the computing device 500) having memory and one or more processors. The method includes: (i) presenting a data visualization page (e.g., the user interface 100) to a user, the data visualization page including a first region for displaying a data visualization (e.g., the data visualization region 107) and a second region for phrase recommendations (e.g., the phrase region 105); (ii) obtaining a dataset selected by the user (e.g., from the database 550), the dataset including a plurality of fields; (iii) generating (e.g., via the phrase generation module 530) a first set of phrase recommendations based on the dataset (e.g., the phrase recommendations 112), each phrase recommendation in the first set of phrase recommendations corresponding to a respective field in the plurality of fields; (iv) displaying the first set of phrase recommendations in the second region (e.g., the suggestions 110 in FIG. 1); (v) receiving a user selection of a first phrase (e.g., the 'Average Price' phrase recommendation 112-1) of the first set of phrase recommendations; and, in response to the user selection: (vi) presenting a data visualization in the first region (e.g., the data visualization 208), the data visualization generated using the first phrase; and (vii) displaying a second set of phrase recommendations (e.g., the suggestions 110 in FIG. 2) generated based on the user selection of the first phrase.

Phrase recommendations are also sometimes called analytical statements. In some implementations, the phrase recommendations are displayed without receiving a phrase query or input from the user (e.g., the phrase recommendations are zero input recommendations). In some implementations, the phrase recommendations are presented in a ranked order (e.g., based on likelihood of use) or an alphabetical order. In some implementations, displaying the first set of phrase recommendations includes sorting the first set based on a probability of concurrence between phrases in the first set of phrase recommendations.

(A2) In some implementations of A1, each phrase in the first set of phrase recommendations includes a respective field of the plurality of fields and a respective operator, and each phrase corresponds to a valid command in a visualization language (e.g., an expression language used by the data visualization application 422). In some implementations, the first set of phrase recommendations are generated based on syntax rules and semantics of data fields of the data source. In this way, each phrase is syntactically correct and semantically consistent. In some implementations, the syntax rules include rules according to a natural language processing (NLP) system for processing natural language commands directed at the data source.

(A3) In some implementations of A1 or A2, the first set of phrase recommendations includes an aggregation phrase and a filter phrase; the aggregation phrase comprises a first field of the plurality of fields and an aggregation operator; and the filter phrase comprises a second field of the plurality of fields, a filter operator, and a value. In some implementations, the aggregation operator is one of: a sum, a count, an average, a mean, maximum, minimum, and the like. In some implementations, the filter operator is one of: less than, greater than, equal to, between, and the like. In some implementations, the phrase recommendations are presented grouped by type of phrase. For example, the filter phrases are presented together in a first region and the aggregation phrases are presented together in a second region of the page. In some implementations, each aggregation is only applied with a constrained set of data source fields based on the field's metadata, e.g. data type and data range type of the field. Table 1, below, shows some example aggregations with corresponding field constraints and example phrases. In some implementations, each field is only applied with a constrained set of data source fields. Table 2, below, shows some example filters with corresponding field constraints and example phrases.

TABLE 1

Aggregation Examples

| Aggregations | Field Constraints | Example Phrases |
| --- | --- | --- |
| Sum, Median, Average, Max, Min | data type: numeric data range type: continuous field role: measure | Sum of Sales |
| Count, DistinctCount | data range type: discrete field role: dimension | Count of Customers |
| Earliest, Latest Group by Field | data type: date/time data type: not date/time field role: measure | Earliest Order Date By City |
| Group by Field's year, quarter, month, week, day | data type: date/time field role: dimension | By Order Date's Year |

TABLE 2

Filter Examples

| Filters | Field Constraints | Example Phrases |
| --- | --- | --- |
| AtLeast, AtMost | data type: numeric | Sales at least $1 |
| StartingInDate, EndingInDate | data type: date/time | Order Date starts in 2011 |
| Between | data type: numeric or date/time | Order Date between 2020 and 2015 Sales between $2 and $10 |
| Contains, StartWithString, EndWithString | data type: text data range type: discrete field role: dimension | Name contains "Smith" |
| FilterTo, Exclude | data type: text data range type: discrete field role: dimension | Filter City to New York Filter City to exclude New York |
| In | data type: date/time | Order Date in February |

(A4) In some implementations of A1-A3, at least one phrase in the first set of phrase recommendations has not previously been selected by a user to visualize the dataset. For example, the at least one phrase is generated using a machine learning algorithm rather than selected from a list of previously used phrases.

(A5) In some implementations of A1-A4, the method further includes, prior to generating the first set of phrase recommendations, identifying a collection of phrases for the dataset, where the first set of phrase recommendations is generated from the collection of phrases, and where incompatible phrases from the collection of phrases are excluded from the first set of phrase recommendations. For example, phrases with a same field as the field used in the first phrase may be excluded as being duplicative. In some implementations, each phrase of the collection of phrases corresponds to a valid command in a visualization language. In some implementations, identifying valid aggregation phrases includes, for each field in the data source, for each aggregation operator, if: (i) the aggregation operator is valid for the field and (ii) the aggregation operator combined with the field is compatible with a displayed visualization, then the aggregation with the field is identified as a valid combination for a phrase. In some implementations, identifying valid filter phrases includes, for each field in the data source, for each filter operator, if: (i) the filter operator is valid for the field and (ii) the filter operator combined with the field and an inferred value is compatible with a displayed visualization, then the filter with the field and the inferred value is identified as a valid combination for a phrase.

(A6) In some implementations of A1-A5, the first set of phrase recommendations are generated based on prior visualization data associated with the dataset. For example, the first set of phrase recommendations are generated based on data from the raw usage data tables 560. In some implementations, the prior visualization data includes information about visualizations generated by a plurality of different users. In some implementations, the prior visualization data includes information about phrases previously selected/used by users to visualize data of the dataset (e.g., selects phrases with the most historical occurrences). In some implementations, a machine learning (ML) algorithm is used to generate the phrase recommendations, where the ML algorithm uses a model trained on historical visualization data (e.g., for the dataset, the user, or a tenancy of the user). For example, the recommender 558 uses model data from the phrase recommendation data model table 562 to generate the first set of phrase recommendations.

(A7) In some implementations of A6, the prior visualization data includes information about occurrences and concurrences of phrases in historical visualizations created by users for the dataset. In some implementations, the method includes computing and storing a concurrence map that maps each phrase to a probability of concurrence with other phrases; and retrieving the concurrence map for generating the first set of phrase recommendations.

(A8) In some implementations of A1-A7, the method further includes generating the second set of phrase recommendations based on the first phrase and prior visualization data associated with the dataset. In some implementations, the second set of phrase recommendations includes the first set plus one or more additional recommendations selected based on the first phrase. In some implementations, generating the second set of phrase recommendations includes validating each phrase in the second set by validating a visualization command representing a combination of the first phrase and the phrase in the second set. In some implementations, the semantics of the data fields of the data source preclude one or more filters based on filters that already exists in the data visualization. As an example, the displayed visualization corresponds to a sum of sales by region. In this example, when generating the second set of phrase recommendations, the phrase 'By Region' is not a valid option because it already exists in the visualization.

(A9) In some implementations of A8, generating the second set of phrase recommendations includes selecting phrases based on respective concurrence probabilities with the first phrase. In some implementations, the method includes computing and storing a concurrence map that maps each phrase to a probability of concurrence with the first phrase; and retrieving the concurrence map for generating the second set of phrase recommendations.

(A10) In some implementations of A1-A9, the method further includes: after displaying the second set of phrase recommendations, receiving a second user selection of a second phrase from the second set of phrase recommendations; and in response to the second user selection: updating the data visualization in the first region based on the first phrase and the second phrase; and displaying a third set of phrase recommendations in the second region. In some implementations, updating the visualization comprises providing a different type of visualization (e.g., a new type of graph or chart).

(A11) In some implementations of A10, the method further includes generating the third set of phrase recommendations, the generating including: identifying a collection of phrases for the dataset; identifying phrases from the collection of phrases that have historically occurred with at least one of the first phrase and the second phrase; and ranking the identified phrases based on concurrence probabilities between the identified phrases and the first and second phrases, wherein the ranking includes prioritizing identified phrases that have historical concurrence with both the first phrase and the second phrase. In some implementations, a greedy algorithm is used to select subsets from the visualization (e.g., the first and second phrases) that have historical occurrence and contain most elements (e.g., 2n−1 subsets, where n is the number of selected phrases). In some implementations, concurrences with subsets having higher cardinality are ranked higher than concurrences with subsets having lower cardinality. In some implementations, a concurrence probability is calculated between each candidate phrase in the collection of phrase and the selected subsets. In some implementations, all the candidate's concurrence probabilities with the various subsets are multiplied together, and the product is assigned as the candidate's concurrence probability.

(A12) In some implementations of A1-A11, the second region includes a phrase building affordance; and the method further includes: receiving a user selection of the phrase building affordance; and in response to the user selection of the phrase building affordance, displaying a user interface to assist the user in constructing a new phrase.

(A13) In some implementations of A1-A12, the second region includes a search field; and the method further includes: receiving a user query via the search field; in accordance with the user query, performing a phrase search; and presenting one or more phrase recommendations based on the phrase search.

(B1) In another aspect, some implementations include a method (e.g., the method 700) performed at a computing system (e.g., the computing device 500) having memory and one or more processors. The method includes: (i) presenting a data visualization page (e.g., the user interface 100) to a user, the data visualization page including a visualization region (e.g., the data visualization region 107) and a phrase region (e.g., the phrase region 105); (ii) obtaining a dataset selected by the user (e.g., from the database 550), the dataset including a plurality of fields; (iii) displaying, in the phrase region, a phrase affordance (e.g., the add field affordance 106) for constructing a phrase; (iv) in response to a user selection of the phrase affordance, presenting a phrase construction menu (e.g., the new field menu 302), the phrase construction menu including a set of fields (e.g., the fields 309, 311, and 313) from the plurality of fields; (v) in response to a user selection of a field from the set of fields, presenting a set of aggregation operators selected based on a field type of the field (e.g., the aggregation operators 326, 328, and 330); (vi) in response to a user selection of an aggregation operator from the set of aggregation operators, generating a first phrase (e.g., the average price phrase 340) using the selected field and the selected aggregation operator; (vii) presenting a data visualization (e.g., the data visualization 208) in the visualization region, the data visualization generated using the first phrase; and (viii) displaying the first phrase as an active phrase in the phrase region.

In some implementations, each phrase represents a validated expression in a visualization language of a data visualization application. In some implementations, the first phrase has not previously been used by a user to visualize the dataset. In some implementations, the data visualization has not previously been constructed by a user to visualize the dataset. In some implementations, the set of aggregation operators are selected based on field type, data range type, and/or field role. In some implementations, the phrase construction menu includes a search field (e.g., the search field 304) for searching the set of fields (e.g., by field name or value).

(B2) In some implementations of B1, the set of fields in the phrase construction menu is sorted based on a calculated likelihood of use of each field. In some implementations, the likelihood of use is calculated based on user preferences (e.g., for a default user or for the particular user), inclusion of the field in historical data visualizations for the dataset, and/or inclusion of the field in previous aggregation phrases.

(B3) In some implementations of B1 or B2, the set of fields in the phrase construction menu are grouped by data types of the respective fields. For example, string type fields are grouped together, number type fields are grouped together, date type fields are grouped together, Boolean type fields are grouped together, and the like. In some implementations, the fields in each data type group are also sorted by likelihood of use. In some implementations, the groups can be collapsed and expanded within the menu.

(B4) In some implementations of B1-B3, the set of fields is generated by selecting only fields from the plurality of fields that are compatible with at least one aggregation operator. For example, the field type is compatible with the aggregation operation and the resulting phrase would not result in an empty set.

(B5) In some implementations of B1-B4, the method further includes, after presenting the data visualization in the visualization region: (i) receiving a second user selection of the phrase affordance; (ii) selecting a second set of fields from the plurality of fields, the selecting including, for each field in the dataset: (a) for each aggregation operator of a plurality of aggregation operators, determining whether the aggregation operator is valid for the field; (b) in accordance with a determination that the aggregation operator is valid for the field, determining whether a phrase having the aggregation operator and the field is compatible with the data visualization; and (c) in accordance with a determination that the phrase having the aggregation operator and the field is compatible, including the field in the second set of fields; and (iii) presenting the second set of fields in the phrase construction menu.

(B6) In some implementations of B5, determining that the aggregation operator is valid for the field includes: determining that the aggregation operator is valid for a data type of the field; and determining that the aggregation operator applied to the field would not result in an empty set for the data visualization.

(B7) In some implementations of B5 or B6, determining that the phrase having the aggregation operator and the field is compatible with the data visualization includes: determining that application of the phrase to the data visualization would change the data visualization; and determining that application of the phrase to the data visualization would not result in an empty set for the data visualization. For example, adding "by region" to a visualization of "sum of sales by region" would result in no change in the visualization. As another example, adding "region to east" to a visualization with "region to west" active would result in an empty set for the visualization.

(B8) In some implementations of B1-B7, the method further includes: (i) displaying, in the phrase region, a filter affordance for constructing a filter phrase; (ii) in response to a user selection of the filter affordance, presenting a filter construction menu, the filter construction menu including a second set of fields from the plurality of fields; (iii) in response to a user selection of a field from the second set of fields, presenting a set of filter operators selected based on a field type of the field from the second set of fields; (iv) in accordance with a user selection of a filter operator from the set of filter operators, generating a second phrase using the selected field from the second set of fields, the selected filter operator, and a field value; (v) presenting a second data visualization in the visualization region, the second data visualization generated using the first phrase and the second phrase; and (vi) displaying the second phrase as an active phrase in the phrase region.

(B9) In some implementations of B8, the field value is selected automatically based on the selected field from the second set of fields and the selected filter operator.

(B10) In some implementations of B8, the method further includes, in response to the user selection of the filter operator, presenting a value input field to the user, where the field value is received from the user via the value input field. In some implementations, the user input is validated as a valid value for the field prior to acceptance.

(B11) In some implementations of B1-B10, the method further includes, after presenting the data visualization in the visualization region: (i) receiving a second user selection of the phrase affordance; (ii) in response to the second user selection of the phrase affordance, presenting the phrase construction menu, the phrase construction menu including a second set of fields from the plurality of fields; (iii) in response to a user selection of a field from the second set of fields, presenting a set of grouping operators; (iv) in response to a user selection of a grouping operator from the set of grouping operators, generating a second phrase using the selected field and the selected grouping operator; (v) updating the data visualization in the visualization region based on the second phrase, including grouping data shown in the data visualization in accordance with the grouping operator; and (vi) displaying the second phrase as an active phrase in the phrase region.

(B12) In some implementations of B1-B11, a visualization type of the data visualization is selected based on a field type of the field in the first phrase. In some implementations, the visualization type is also based on the aggregation operator, user preferences, historical usage, and the like.

In another aspect, some implementations include a computing system including one or more processors and memory coupled to the one or more processors, the memory storing one or more programs configured to be executed by the one or more processors, the one or more programs including instructions for performing any of the methods described herein (e.g., A1-A13 and B1-B12 above).

In yet another aspect, some implementations include a non-transitory computer-readable storage medium storing one or more programs for execution by one or more processors of a computing system, the one or more programs including instructions for performing any of the methods described herein (e.g., A1-A13 and B1-B12 above).

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method performed at a computing system having memory and one or more processors, the method comprising:
    presenting a data visualization page to a user, the data visualization page including a visualization region and a phrase region;
    obtaining a dataset selected by the user, the dataset including a plurality of fields;
    displaying, in the phrase region, a phrase affordance for constructing a phrase;
    in response to a first user selection of the phrase affordance, presenting a phrase construction menu, the phrase construction menu including a set of fields from the plurality of fields;
    in response to user selection of a field from the set of fields, presenting a set of aggregation operators selected based on a field type of the field;
    in response to user selection of an aggregation operator from the set of aggregation operators, generating a first phrase using the selected field and the selected aggregation operator;
    presenting a data visualization in the visualization region, the data visualization generated using the first phrase;
    displaying the first phrase as an active phrase in the phrase region;
    receiving a second user selection of the phrase affordance;
    determining whether a second phrase, having a second field of the plurality of fields and a second aggregation operator of a plurality of aggregation operators, is compatible with the data visualization; and
    in accordance with a determination that the second phrase is compatible with the data visualization, presenting the second field in the phrase construction menu.

2. The method of claim 1, wherein the set of fields in the phrase construction menu is sorted based on a calculated likelihood of use of each field.

3. The method of claim 1, wherein the set of fields in the phrase construction menu are grouped by data types of the respective fields.

4. The method of claim 1, wherein the set of fields is generated by selecting only fields from the plurality of fields that are compatible with at least one aggregation operator.

5. The method of claim 1, further comprising, after receiving the second user selection of the phrase affordance;
    selecting a second set of fields from the plurality of fields, the selecting including, for each field in the dataset:
        for each aggregation operator of a plurality of aggregation operators, determining whether the aggregation operator is valid for the field;
        in accordance with a determination that the aggregation operator is valid for the field, determining whether a phrase having the aggregation operator and the field is compatible with the data visualization; and
        in accordance with a determination that the phrase having the aggregation operator and the field is compatible, including the field in the second set of fields; and
    presenting the second set of fields in the phrase construction menu.

6. The method of claim 5, wherein determining that the aggregation operator is valid for the field comprises:
    determining that the aggregation operator is valid for a data type of the field; and
    determining that the aggregation operator applied to the field would not result in an empty set for the data visualization.

7. The method of claim 5, wherein determining that the phrase having the aggregation operator and the field is compatible with the data visualization comprises:
    determining that application of the phrase to the data visualization would change the data visualization; and
    determining that application of the phrase to the data visualization would not result in an empty set for the data visualization.

8. The method of claim 1, further comprising:
    displaying, in the phrase region, a filter affordance for constructing a filter phrase;
    in response to a user selection of the filter affordance, presenting a filter construction menu, the filter construction menu including a second set of fields from the plurality of fields;
    in response to a user selection of a field from the second set of fields, presenting a set of filter operators selected based on a field type of the field from the second set of fields;
    in accordance with a user selection of a filter operator from the set of filter operators, generating a second phrase using the selected field from the second set of fields, the selected filter operator, and a field value;
    presenting a second data visualization in the visualization region, the second data visualization generated using the first phrase and the second phrase; and
    displaying the second phrase as an active phrase in the phrase region.

9. The method of claim 8, wherein the field value is selected automatically based on the selected field from the second set of fields and the selected filter operator.

10. The method of claim 8, further comprising, in response to the user selection of the filter operator, presenting a value input field to the user, wherein the field value is received from the user via the value input field.

11. The method of claim 1, further comprising:
    in response to the second user selection of the phrase affordance, presenting the phrase construction menu, the phrase construction menu including a second set of fields from the plurality of fields;
    in response to a user selection of a field from the second set of fields, presenting a set of grouping operators;

in response to a user selection of a grouping operator from the set of grouping operators, generating a second phrase using the selected field and the selected grouping operator;

updating the data visualization in the visualization region based on the second phrase, including grouping data shown in the data visualization in accordance with the grouping operator; and displaying the second phrase as an active phrase in the phrase region.

12. The method of claim 1, wherein a visualization type of the data visualization is selected based on a field type of the field in the first phrase.

13. A computing device, comprising:
one or more processors;
memory;
a display; and
one or more programs stored in the memory and configured for execution by the one or more processors, the one or more programs comprising instructions for:
    presenting a data visualization page to a user, the data visualization page including a visualization region and a phrase region;
    obtaining a dataset selected by the user, the dataset including a plurality of fields;
    displaying, in the phrase region, a phrase affordance for constructing a phrase;
    in response to a first user selection of the phrase affordance, presenting a phrase construction menu, the phrase construction menu including a set of fields from the plurality of fields;
    in response to user selection of a field from the set of fields, presenting a set of aggregation operators selected based on a field type of the field;
    in response to user selection of an aggregation operator from the set of aggregation operators, generating a first phrase using the selected field and the selected aggregation operator;
    presenting a data visualization in the visualization region, the data visualization generated using the first phrase;
    displaying the first phrase as an active phrase in the phrase region;
    receiving a second user selection of the phrase affordance;
    determining whether a second phrase, having a second field of the plurality of fields and a second aggregation operator of a plurality of aggregation operators, is compatible with the data visualization; and
    in accordance with a determination that the second phrase is compatible with the data visualization, presenting the second field in the phrase construction menu.

14. The computing device of claim 13, wherein the set of fields in the phrase construction menu is sorted based on a calculated likelihood of use of each field.

15. The computing device of claim 13, wherein the one or more programs further comprise instructions for, after receiving the second user selection of the phrase affordance:
    selecting a second set of fields from the plurality of fields, the selecting including, for each field in the dataset:
        for each aggregation operator of a plurality of aggregation operators, determining whether the aggregation operator is valid for the field;
        in accordance with a determination that the aggregation operator is valid for the field, determining whether a phrase having the aggregation operator and the field is compatible with the data visualization; and
        in accordance with a determination that the phrase having the aggregation operator and the field is compatible, including the field in the second set of fields; and
    presenting the second set of fields in the phrase construction menu.

16. The computing device of claim 15, wherein determining that the aggregation operator is valid for the field comprises:
    determining that the aggregation operator is valid for a data type of the field; and
    determining that the aggregation operator applied to the field would not result in an empty set for the data visualization.

17. The computing device of claim 15, wherein determining that the phrase having the aggregation operator and the field is compatible with the data visualization comprises:
    determining that application of the phrase to the data visualization would change the data visualization; and
    determining that application of the phrase to the data visualization would not result in an empty set for the data visualization.

18. A non-transitory computer-readable storage medium storing one or more programs configured for execution by a computing device having one or more processors, memory, and a display, the one or more programs comprising instructions for:
    presenting a data visualization page to a user, the data visualization page including a visualization region and a phrase region;
    obtaining a dataset selected by the user, the dataset including a plurality of fields;
    displaying, in the phrase region, a phrase affordance for constructing a phrase;
    in response to a first user selection of the phrase affordance, presenting a phrase construction menu, the phrase construction menu including a set of fields from the plurality of fields;
    in response to user selection of a field from the set of fields, presenting a set of aggregation operators selected based on a field type of the field;
    in response to user selection of an aggregation operator from the set of aggregation operators, generating a first phrase using the selected field and the selected aggregation operator;
    presenting a data visualization in the visualization region, the data visualization generated using the first phrase;
    displaying the first phrase as an active phrase in the phrase region;
    receiving a second user selection of the phrase affordance;
    determining whether a second phrase, having a second field of the plurality of fields and a second aggregation operator of a plurality of aggregation operators, is compatible with the data visualization; and
    in accordance with a determination that the second phrase is compatible with the data visualization, presenting the second field in the phrase construction menu.

19. The non-transitory computer-readable storage medium of claim 18, wherein the one or more programs further comprise instructions for, after receiving the second user selection of the phrase affordance:
    selecting a second set of fields from the plurality of fields, the selecting including, for each field in the dataset:

for each aggregation operator of a plurality of aggregation operators, determining whether the aggregation operator is valid for the field;

in accordance with a determination that the aggregation operator is valid for the field, determining whether a phrase having the aggregation operator and the field is compatible with the data visualization; and in accordance with a determination that the phrase having the aggregation operator and the field is compatible, including the field in the second set of fields; and presenting the second set of fields in the phrase construction menu.

20. The non-transitory computer-readable storage medium of claim 19, wherein determining that the aggregation operator is valid for the field comprises:

determining that the aggregation operator is valid for a data type of the field; and determining that the aggregation operator applied to the field would not result in an empty set for the data visualization.

\* \* \* \* \*